(12) United States Patent
Iki et al.

(10) Patent No.: US 8,334,628 B2
(45) Date of Patent: Dec. 18, 2012

(54) STATOR COIL FOR AXIAL GAP ELECTRICAL ROTATING MACHINE

(75) Inventors: Tomotaka Iki, Wako (JP); Hisashi Murakami, Wako (JP); Masaru Ozawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 70 days.

(21) Appl. No.: 13/139,047

(22) PCT Filed: Nov. 18, 2009

(86) PCT No.: PCT/JP2009/069893
§ 371 (c)(1),
(2), (4) Date: Jun. 10, 2011

(87) PCT Pub. No.: WO2010/067710
PCT Pub. Date: Jun. 17, 2010

(65) Prior Publication Data
US 2011/0241463 A1    Oct. 6, 2011

(30) Foreign Application Priority Data

Dec. 12, 2008 (JP) ................................. 2008-316520

(51) Int. Cl.
*H02K 1/00* (2006.01)
(52) U.S. Cl. ....................................... 310/179; 310/180
(58) Field of Classification Search .................. 310/179, 310/180, 184
See application file for complete search history.

(56) References Cited

U.S. PATENT DOCUMENTS

| | | | |
|---|---|---|---|
| 3,091,715 A | 5/1963 | Henry-Baudot | |
| 3,159,764 A | 12/1964 | Henry-Baudot | |
| 4,510,409 A | 4/1985 | Kanayama | |
| 6,281,614 B1* | 8/2001 | Hill | 310/207 |
| 6,856,063 B1* | 2/2005 | Kelecy et al. | 310/179 |
| 2006/0267439 A1* | 11/2006 | Rajasingham | 310/179 |
| 2008/0042515 A1 | 2/2008 | Butterfield | |

FOREIGN PATENT DOCUMENTS

| | | |
|---|---|---|
| JP | 51-104501 A | 9/1976 |
| JP | 04331431 A | 11/1992 |
| JP | 2006-288074 A | 10/2006 |
| JP | 2008-061357 A | 3/2008 |

OTHER PUBLICATIONS

International Search Report application No. PCT/JP2009/069893 dated Apr. 19, 2010.

* cited by examiner

*Primary Examiner* — Nguyen N Hanh
(74) *Attorney, Agent, or Firm* — Squire Sanders (US) LLP

(57) ABSTRACT

A stator coil for an axial gap electrical rotating machine includes first coil pieces, second coil pieces, and an annular base member having recesses for arranging and holding the first and second coil pieces in back and front faces of the annular base member. The first and second coil pieces are arranged in a circumferential direction of the annular base member in the recesses in both back and front faces of the base member. The first joint portion of one first coil piece faces and is connected to the first joint portion of another first coil piece. The second joint portion of one first coil piece faces and being connected to the second joint portion of another second coil piece or the third joint portion of one second coil piece to provide a coil loop.

13 Claims, 13 Drawing Sheets

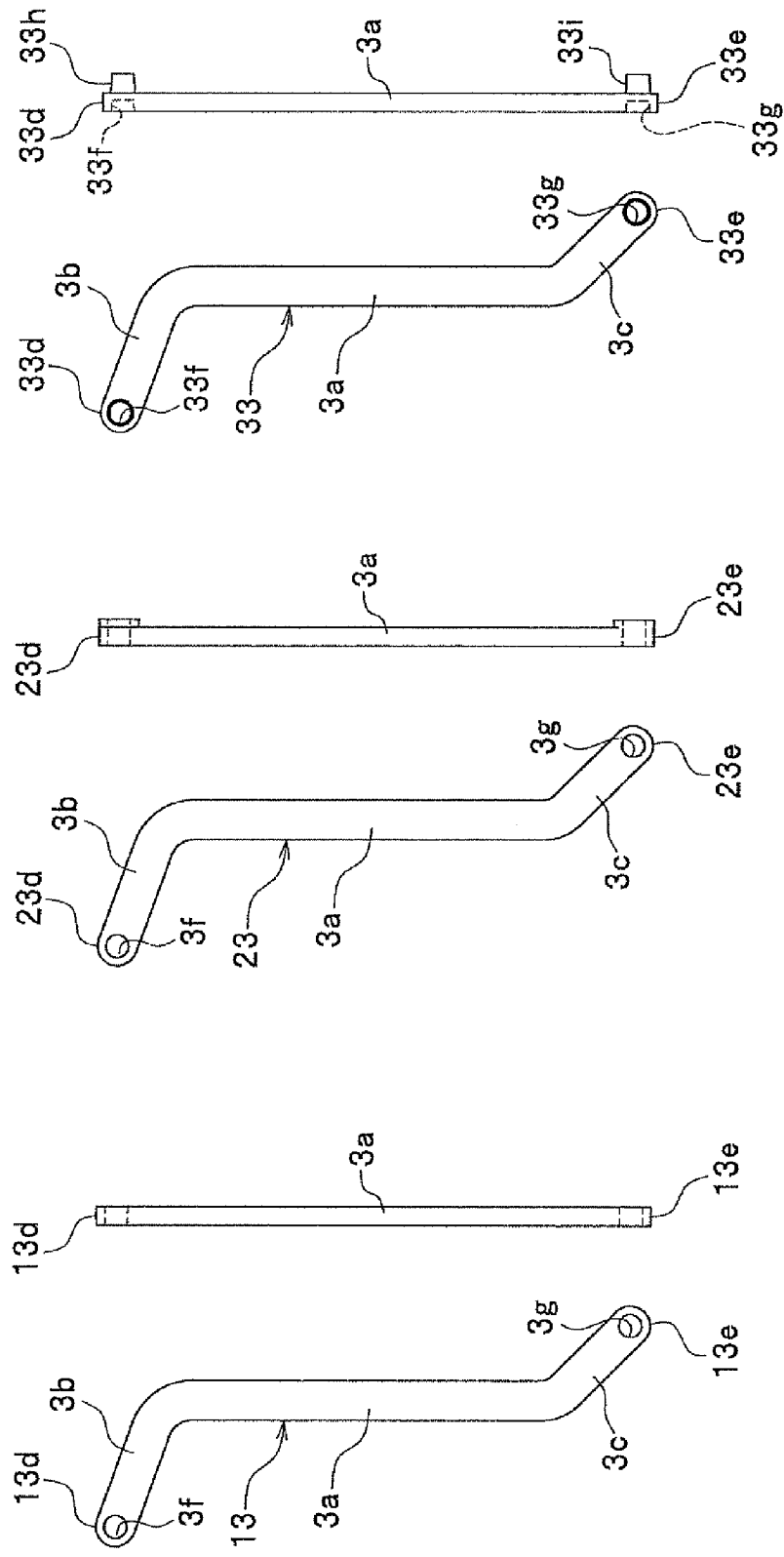

STATOR COIL FOR AXIAL GAP ELECTRICAL ROTATING MACHINE

TECHNICAL FIELD

The present invention relates to a stator coil used in an electrical rotating machine, and more specifically, a stator coil for an axial gap electrical rotating machine.

BACKGROUND ART

Conventionally, various stators used in an axial gap electrical rotating machine have been proposed. For example, U.S. Pat. No. 3,159,764 discloses a single-phase armature coil formed by a printed circuit on an insulating member. The armature coil comprises two pairs of half-turn conductors of which inner/outer peripheries are connected together, respectively by a through-hole technique used for a printed circuit board.

JP 51-104501A discloses a stator coil comprising a discoid unit coil having half coils in a predetermined shape formed in a radially on both surfaces of an insulated substrate. According to the unit coil, one-turn coil is formed by connecting end portions of the half coils at both sides protruding at inner/outer peripheries of the insulated substrate. Plural unit coils are stacked together, and the half coils have at least two different lengths so that an end portion of each half coil is located on a different circumference of circle.

JP 04-331431A discloses a structure of a stator coil in which a circuit pattern is printed on a resin substrate to be held, a recess is formed therein, and a stator coil is fitted therein, thus positioning, fixing, and wiring of the stator coil are carried out simultaneously.

JP 2006-288074A discloses a structure of an axial gap electrical rotating machine. The electrical rotating machine has an electromagnetic coil that comprises plural conductive bars, and respective leading ends thereof which are to be conducted one another are joined together. According to this electrical rotating machine, as the electromagnetic coil is formed by the conductive bars, a step of winding up an electromagnetic coil around an iron core can be simplified, thus improving the productivity.

An explanation will be given of an electrical rotating machine disclosed in JP 2008-61357A with reference to FIG. 12. FIG. 12 is a perspective view schematically showing a connection structure of a coil portion of a stator coil used in an axial gap electrical rotating machine. As shown in the figure, a stator coil 100 for an axial gap electrical rotating machine has an annular (ring) coil plate 101, and a coil bus bar (not shown) which is connected to a power feeding system (not shown) arranged at, for example, an inner periphery side of the coil plate 101. The coil plate 101 is formed in such a way that a first coil plate element 101A having a wiring pattern 102 and a second coil plate element 101B having a wiring pattern 103 face with each other so that the wiring pattern 102 and the wiring pattern 103 are oppositely oriented in a circumferential direction, and outer periphery edges and inner periphery edges are joined together with a space 110 so that the facing wiring patterns 102, 103 are spaced apart from each other.

Multiple numbers of polygonal-line coil segments 104a are formed across an entire annular region where the wiring pattern 102 is formed. The polygonal-line coil segments 104a form a coil bundle as a whole. Each polygonal-line coil segment 104a is supported by an outer periphery edge supporting member 151 and an inner periphery edge supporting member 152. A slit 105 is formed between adjoining polygonal-line coil segments 104a.

The polygonal-line coil segment 104a has a width in a circumferential direction which is wide at the outer periphery side and is narrow at the inner periphery side so as to form the slit 105. The polygonal-line coil segment 104a also has a central straight-line portion 101c arranged at a center, an oblique portion 101b supported by the outer periphery edge supporting member 151 and bent in an oblique direction, and another oblique portions 101d supported by the inner periphery edge supporting member 152 and bent in another oblique direction (see, in more detail, FIG. 13 of JP 2008-61357A). The polygonal-line coil segments 104a further have terminal portions, respectively, formed at a part thereof, and the terminal portions are connected by a bus bar or the like. One terminal is used as a power feeding input terminal 120, while another terminal is used as a power feeding output terminal 121, so that a U-phase coil loop having both coil loop elements connected in series is formed.

Note that FIG. 12 shows the U-phase coil loop only as an example, a V-phase coil loop and a W-phase coil loop have the same shape and the same structure as those of the U-phase coil loop and only wirings differ, so that explanations of those coil loops are omitted to simplify the explanation.

DISCLOSURE OF INVENTION

According to the structures of the conventional stator coils for an axial gap electrical rotating machine, however, there are some problems or a matter which must be improved as follows:

According to the structure of U.S. Pat. No. 3,159,764, it is difficult to make the conductor in cross-sectional area large, so that no large current can flow therethrough. Moreover, because a coil loop is arranged merely in a circumferential direction, a print pattern must be changed in accordance with a design change every time the number of phases, the number of turns, and the like are changed.

According to the structure of JP 51-104501A, coils are provided in a stacking direction, the number of coils corresponding to the number of turns, so that a process of cutting inner/outer peripheries (trimming) is required in order to form a loop of a pattern coil. A chip created by the cutting process may enter a space, resulting in occurrence of contamination, so that the insulation reliability cannot be ensured. Therefore, according to the structure of JP 51-104501A, an insulated space can not be made small, and a space factor which shows a ratio of an occupancy space by a coil other than an insulated member in a cross section of the stator coil cannot be increased.

According to the structure of JP 04-331431A, if a structure that a pattern coil having a loop for each unit coil is fitted into the held member is adopted, it is difficult to flexibly cope with a design change, such as a change in the number of phases, and the number of turns, and merely a concentrated winding structure can be employed essentially, so that there may be problems like non-uniform rotation and variation in torque.

According to the structure of JP 2006-288074A, when a required coil pattern is formed by arranging individual conductive bars, a process of cutting inner/outer peripheries becomes unnecessary unlike JP 51-104501A, but assembling of individual bars and welding thereof to form a turn are cumbersome and complicated, so that the productivity is poor.

According to the structure of JP 2008-61357A, there is an advantageous that a large current can flow in comparison with the foregoing other prior arts, but there is a demand for a structure which can allow the large current to continuously flow, and which improves the easiness of manufacturing and the insulation reliability. Moreover, a process (trimming) of cutting inner/outer peripheries is required to form a loop of a pattern coil, a chip created by the cutting process may enter a space, resulting in occurrence of contamination, so that the insulation reliability cannot be ensured.

The present invention has been made in view of the foregoing circumstances, and it is an object of the present invention to provide a stator coil for an axial gap electrical rotating machine which can accomplish a high conductor occupancy, is easily manufactured, and has a high insulation reliability.

A first aspect of the present invention provides a stator coil for an axial gap electrical rotating machine, the stator coil comprising: a plurality of first coil pieces each comprising a conductive material; a plurality of second coil pieces each comprising a conductive material; and an annular base member having recesses on two sides thereof and through holes, wherein the recesses are arranged in a circumferential direction of the annular base member and hold the first coil pieces and the second coil pieces; wherein the first coil piece comprises: a first middle bar portion; a first bent portion and a second bent portion continuous from one end of the first middle bar portion and an other end thereof, respectively, and bent at predetermined angles in the circumferential direction; a first joint portion formed at a leading end of the first bent portion; and a second joint portion at a leading end of the second bent portion, wherein the second coil piece comprises:

a second middle bar portion; a third bent portion and a fourth bent portion continuous from one end of the second middle bar portion and an other end thereof, respectively, and bent at predetermined angles in the circumferential direction; a power feeding terminal connection portion formed at one leading end of either one of the third bent portion or the fourth bent portion; and a third joint portion at an other leading end of the third bent portion and the fourth bent portion; and wherein the first joint portions of one and another of the first coil pieces face and are connected to each other across the base member through the through holes, wherein the second joint portion of one of the second coil pieces or the third joint portion of one of the second coil pieces faces the second joint portion of another of the first coil pieces and are connected to each other, across the base member through the through holes to provide a coil loop.

According to the first aspect, the stator coil for an axial gap electrical rotating machine has a first coil piece and a second coil piece arranged in recesses formed in back and front faces of a base member, and first joint portions, second joint portions, and third joint portions facing with each other back and front are respectively connected together to form a predetermined coil loop, thereby improving the insulation reliability between conductors (first coil piece and second coil piece), and facilitating manufacturing of the stator coil. Moreover, a structure in which the number of turns of a coil can be increased in the stacking direction of the base members can be employed, an insulated portion between the first coil piece/second coil piece and the base member can be significantly reduced in comparison with a conventional structure shown in FIG. 12 in which the number of turns of a coil is increased in the circumferential direction. Furthermore, because the first coil piece and the second coil pieces are arranged on the base member as separate parts, both coil pieces can be manufactured by machining such as pressing, and when the number of turns of the stator coil is changed, it is possible to cope with such a change by merely increasing or decreasing the number of coil units each having the base member on which the first coil piece and the second coil piece are arranged.

A second aspect of the present invention provides the stator coil based on the first aspect, further comprising a bus bar, wherein the stator coil comprising two of the second coil pieces adjoining each other on one of the two sides of the base member, and the bus bar electrically connect the power feeding terminal connection portions of the second coil pieces adjoining each other, and wherein the stator coil comprising further two of the second coil pieces adjoining each other on the other of the two sides of the base member to be supplied with power.

According to the second aspect of the present invention, if the stator coil for an axial gap electrical rotating machine has a power-feeding-terminal connecting portion provided at an inner periphery side of the base member, such power-feeding-terminal connecting portion is connected to another power-feeding-terminal connecting portion located at the inner periphery side, and if a power-feeding-terminal connecting portion is provided at an outer periphery side of the base member, such power-feeding-terminal connecting portion is connected to another power-feeding-terminal connecting portion located at the outer periphery side to supply power to the formed coil loop.

A third aspect of the present invention provides the stator coil based on the first aspect, further comprising: a first interlayer connection portion configured to connect the first joint portions facing each other; and a second interlayer connection portion configured to connect the second joint portion or the third joint portion and the second joint portion facing each other through the through holes.

According to the third aspect of the present invention, the stator coil for an axial gap electrical rotating machine has the first coil piece and the second coil piece arranged in the recesses of the base member, and the first joint portions, the second joint portions, and the third joint portions, respectively facing with each other can be easily joined together by an interlayer connection portion via respective through-holes.

A fourth aspect of the present invention provides the stator coil based on the first aspect, wherein the first and second interlayer connection portions each comprise a joint pin.

According to the fourth aspect of the present invention, the stator coil for an axial gap electrical rotating machine has the first joint portions, the second joint portions, and the third joint portions respectively facing with each other and respectively connected together by the interlayer connection portion via respective through-holes, even if portions other than the first joint portions, the second joint portions, and the third joint portions located back and front are insulated (portions other than a portion which must be electrically conductive), respective such portions can be electrically connected by the interlayer connection portion.

A fifth aspect of the present invention provides the stator coil based on the first aspect, wherein the interlayer connection portion comprises an ultrasonic joining layer.

According to the fifth aspect of the present invention, the stator coil for an axial gap electrical rotating machine has the first joint portions, the second joint portions, and the third joint portions, respectively facing with each other via the through-hole and joined together by ultrasonic joining, resulting in reduction of the number of parts, and improvement of the reliability of the connected portion and the productivity.

A sixth aspect of the present invention provides the stator coil based on the first aspect, wherein the recesses are arranged so as to hold the first and second middle bar portions, at a regular interval in the circumferential direction, to be extended in radial directions and the power-feeding-terminal connection portion more outward or inward than the first and second joint portions in the radial direction.

According to the sixth aspect of the present invention, the stator coil has the power-feeding-terminal connecting portion protruding toward the inner periphery or the outer periphery beyond the first coil piece or the second coil piece, a connection to an external power feeding terminal can be easily established.

A seventh aspect of the present invention provides the stator coil based on the first aspect, wherein the base member further comprising a through hole for supporting a magnetic flux converting member comprising a ferromagnetic material.

According to the seventh aspect of the present invention, the stator coil for an axial gap electrical rotating machine has a magnetic flux transfer member formed of a ferromagnetic material in a magnetic-flux-transfer-member through-hole of the base member, so that even if the thickness of the stator coil increases by stacking the base members, reduction of the magnetic flux amount can be substantially avoided by increasing the thickness of the magnetic flux transfer member in accordance with what corresponds to the increment of the thickness of the stator coil, resulting in no output reduction.

An eighth aspect of the present invention provides the stator coil based on the first aspect, wherein the first and second coil pieces have a width greater than a thickness thereof.

According to the eighth aspect of the present invention, wherein the first coil piece and the second coil piece can be easily manufactured with a good precision of contour using a general-purpose machine tool like a pressing machine, and a cut process is not required after conductive materials are connected, so that no contamination originating from metal powders occurs.

A ninth aspect of the present invention provides the stator coil based on the first aspect, wherein the conductive material is selected from the group comprising copper, copper alloy, aluminum, and aluminum alloy.

According to the ninth aspect of the present invention, the first coil piece and the second coil piece can be formed of, for example, copper, a copper alloy, aluminum, or an aluminum alloy, and the material can be selected from various ranges.

A tenth aspect of the present invention provides the stator coil based on the first aspect, wherein the recesses are arranged to hold the first and second middle bar portions on the two sides of the base member, and a pair of the recesses on the two faces are at corresponding opposite positions to arrange a combination of the first and second middle bar portions in the pair of the recesses in parallel and adjacently.

According to the tenth aspect of the present invention, the stator coil for an axial gap electrical rotating machine has a one-side recess and an another-side recess at a position where a middle bar portion of the first coil piece and the middle bar portion of the second coil piece are aligned between the reverse face and the front face and in a direction facing with each other, so that a large number of first coil pieces and second coil pieces can be arranged in the circumferential direction.

An eleventh aspect of the present invention provides the stator coil based on the tenth aspect, wherein the recesses on one of the two sides of the base member hold the first and second coil pieces so as to orient the first and second bent portions the circumferential direction, and the recesses on the other of the two sides of the base member hold the first and second coil pieces so as to orient the first and second bent portions in an opposite direction of the circumferential direction.

According to the eleventh aspect of the present invention, the stator coil has the first coil pieces and the second coil pieces which are arranged in the one-side recess and the another-side recess and which are formed in the same shape, respectively.

A twelfth aspect of the present invention provides the stator coil based on the first aspect, wherein the base member comprises a plurality of the base members stacked on an axial direction thereof, each comprising the first and second coil pieces.

According to the twelfth aspect of the present invention, the stator coil for an axial gap electrical rotating machine can increase the number of turns by stacking the base members.

A thirteenth aspect of the present invention provides the stator coil based on the twelfth aspect, wherein the power feeding terminal connecting portions comprise first to third types of connectors, the first type of the connectors are connected to each other on one of the two sides of the base member, the second type of the connector are connected to each other on two adjoining base members, and the third type of the power feeding terminals connecting portions are supplied with power.

According to the thirteenth aspect of the present invention, when the base members each having the first coil piece and the second coil piece arranged thereon are stacked together, the stator coil for an axial gap electrical rotating machine can increase the number of turns.

The present invention provides the stator coil for an axial gap electrical rotating machine can have following advantages.

Because the whole stator coil can be assembled by arranging the first coil piece and the second coil piece on the base member, the assembling work is easy.

Because the stator coil can increase the number of turns of a coil in a direction in which the base members are stacked, an insulated portion between the first coil piece/second coil piece and the base member can be significantly reduced in comparison with the conventional structure in which the number of turns is increased in the circumferential direction, thus improving the insulation reliability.

Further, because the stator coil employs a structure in which the first coil piece and the second coil piece are arranged on the base member, the degree of freedom against a change in the number of turns of a coil and the number of phases is improved.

BRIEF DESCRIPTION OF DRAWINGS

FIGS. 9A to 9F are plane and side views showing other structures of the first coil piece used in the stator coil;

DETAILED DESCRIPTION OF THE INVENTION

Figure 1:
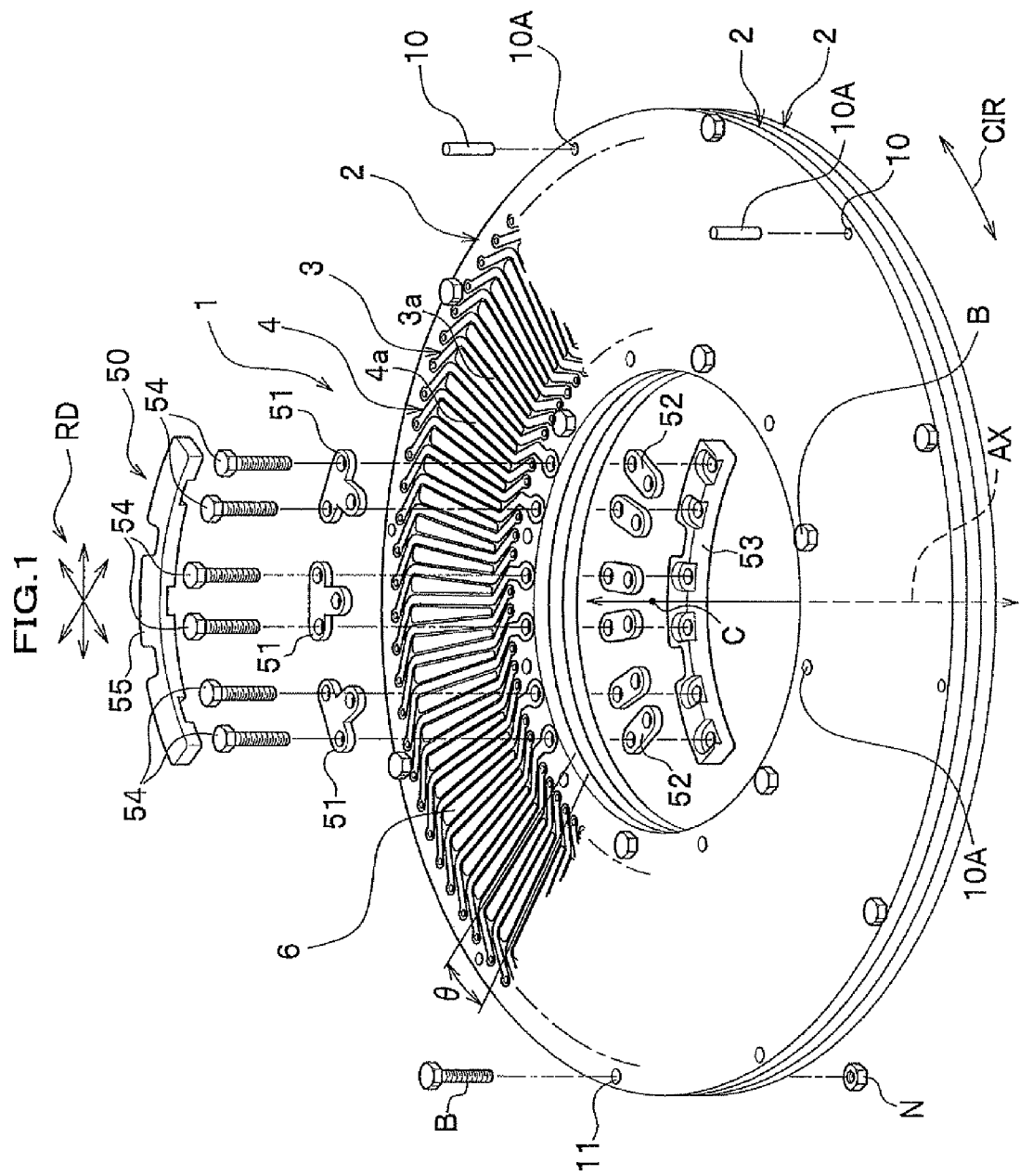
FIG. 1 is a perspective view exemplary showing a whole stator coil of the present invention for an axial gap electrical rotating machine with a part of the stator coil being omitted.
Figure 2:
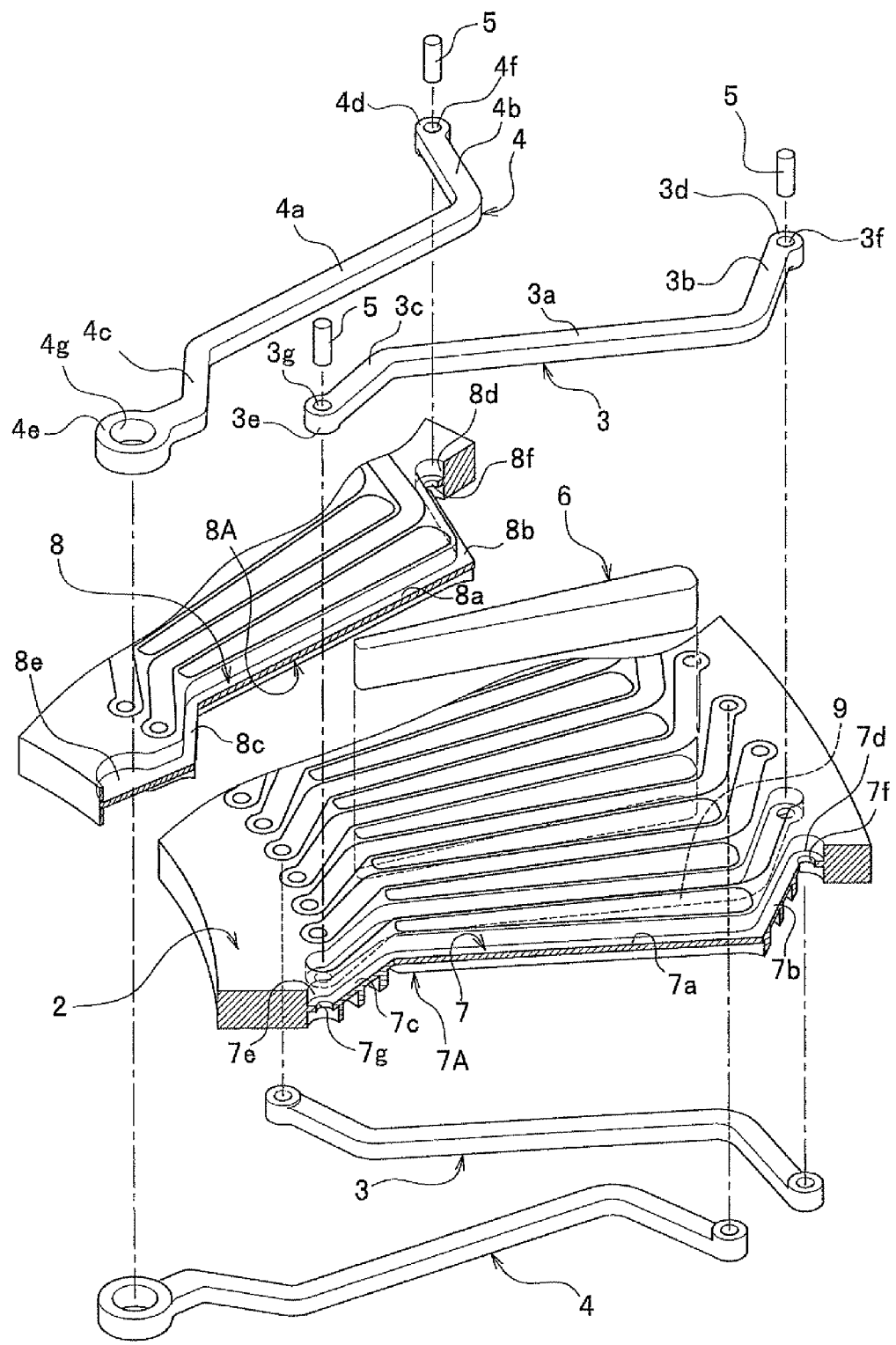
FIG. 2 is an exploded perspective view showing a relationship among a base member, a first coil piece, a second coil piece, and a magnetic flux transfer member in the stator coil of the present invention for an axial gap electrical rotating machine with those elements being partially omitted.
Figures 3A, 3B, 3C, 3D:
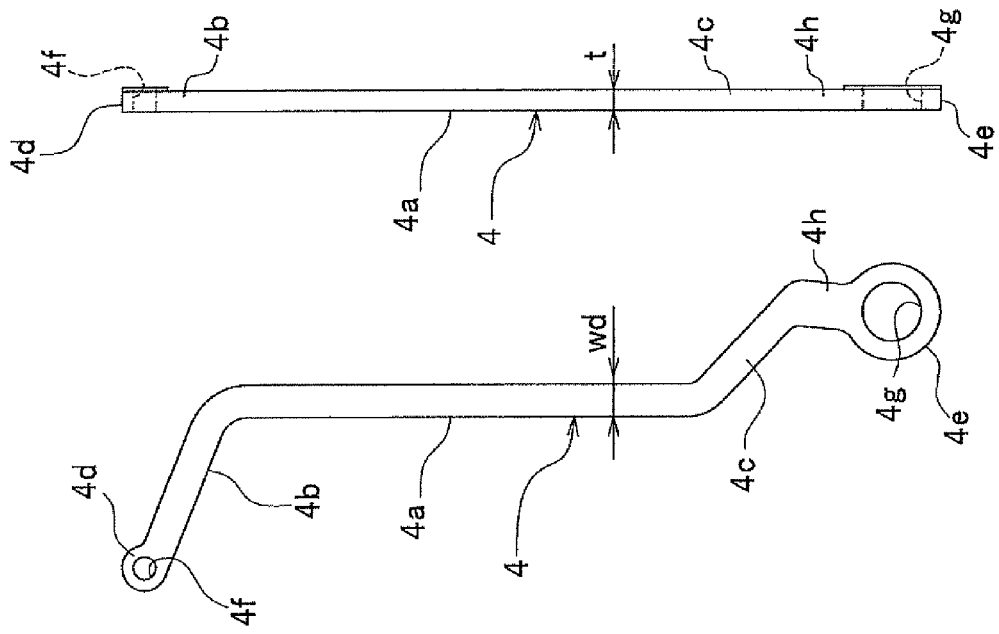
FIGS. 3A and 3B are plane and side views showing the first coil piece used in the stator coil of the present invention for an axial gap electrical rotating machine.
FIG. 3C and 3D are plane and side views showing the second coil piece used in the stator coil of the present invention for an axial gap electrical rotating machine.

Embodiments of the present invention will be described below with reference to the accompanying drawings. FIG. 1 is a perspective schematically showing a whole stator coil 1 for an axial gap electrical rotating machine with partial omission. FIG. 2 is an exploded perspective view showing a relationship among a base member 2, a first coil piece 3, a second coil piece 4, and a magnetic flux transfer member 6 in the stator coil 1 for an axial gap electrical rotating machine with partial omission. FIGS. 3A and 3B are plane and side views showing the first coil piece 3 used in the stator coil 1 for an axial gap electrical rotating machine, and FIGS. 3C and 3D are plane and side views showing the second coil piece 4 used in the stator coil 1 for an axial gap electrical rotating machine. In the embodiment, an explanation will be given of a case in which a stator coil 1 having three layers (three base members) is defined as one unit. However, the minimum unit of the stator coil 1 is one layer (one base member), and the number of stacked layers is not limited to any particular number.

As shown in FIG. 1, the stator coil 1 for an axial gap electrical rotating machine mainly comprises an annular base member 2, and first coil pieces 3 and second coil pieces 4 both arranged on the annular base member 2. A magnetic flux transfer member 6 is arranged between each first coil piece 3 and each second coil piece 4. The stator coil 1 is arranged so as to face a non-illustrated rotor, and is connected to a non-illustrated power feeding system arranged at the center of the base member 2 via a terminal member 50 such as a bus bar (power feeding terminal) 51 connected to a power-feeding-terminal connecting portion 4e of the second coil piece 4 to be discussed later. In this condition, the stator coil 1 is used while being arranged, for example, at a predetermined position in a wheel of a vehicle.

As shown in FIGS. 2 and 3A to 3D, the first coil piece 3 has a middle bar portion 3a, a first bent portion 3b continuous from one end of the middle bar portion 3a and bent in one direction of a circumferential direction CIR of the annular base member 2 (a bent part and a straight bar), a second bent portion 3c continuous from another end of the middle bar portion 3a and bent in another direction of the circumferential direction CIR (a bent part and a straight bar), a first joint portion 3d formed in a ring at a leading end of the first bent portion 3a, and a second bent portion 3e formed in a ring at a leading end of the second bent portion 3c. The first coil piece 3 is formed of an aluminum alloy (or aluminum), has a joint through-hole 3f formed at the first joint portion 3d in a thickness direction (an axial direction AX), and has a joint through-hole 3g formed at the second joint portion 3e in a thickness direction (the axial direction AX).

Figure 6:
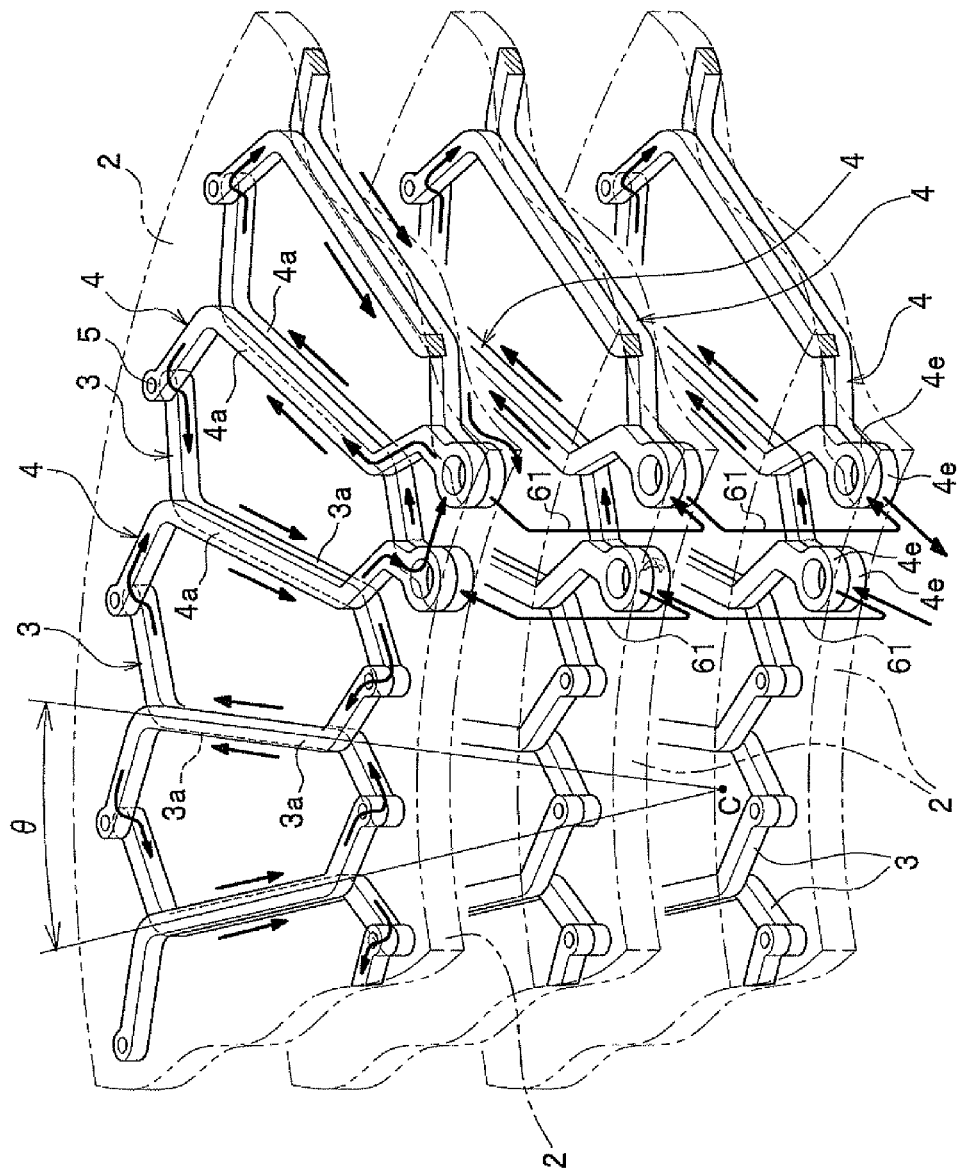
FIG. 6 is a perspective view exemplary showing a coil loop of the stator coil for an axial gap electrical rotating machine.

As shown in FIGS. 3A and 3B, the first coil piece 3 is so formed as to have a width wd greater than a thickness t of the first coil piece 3. This makes a press process easier. The first coil piece 3 has the middle bar portion 3a linearly formed so that the middle bar portion 3a is arranged so as to extend from a direction of the center of the base member 2 (center C of rotation) in a radial direction RD. The first coil piece 3 has the first bent portion 3b and the second bent portion 3c respectively bent in opposite directions in the circumferential direction CIR at predetermined angles. As shown in FIG. 6, the bending angles and lengths of the first bent portion 3b of the first coil piece 3 and the second bent portion 3c are set such that a pair of the first coil pieces 3 on the reverse and front faces (two sides) of the base member 2 are connected together makes an angle θ when viewed from the center C of rotation. That is, the angle θ is set in such that S- and N-magnetic poles of a non-illustrated rotor used together with have the same angular positions in the circumference direction CIR.

Further, the recesses 7 and 8 on one side of the base member 2 are formed so as to orient the bent portion 3b and 4b (3c and 4c) in a direction of the circumferential direction CIR, and the recesses 7 and 8 on the other side of the base member 2 are formed so as to orient the bent portion 3b and 4b (3c and 4c) in an opposite direction of the circumferential direction CIR.

As shown in FIG. 3A, the first joint portion 3d of the first coil piece 3 and the second joint portion 3e thereof are formed to have annular leading ends of the first bent portion 3b and the second bent portion 3c, respectively. The first and the second joint portions 3d, 3e have the joint through-holes 3f, 3g, respectively, formed in the annular central portions in the thickness direction (AX). The first and second joint portions 3d, 3e are joined together with respective first and second joint portions 3d, 3e of the first coil piece 3 arranged on another side of the base member 2 or a third joint portion 4d of the second coil piece 4 to be discussed later by a joint pin 5.

As shown in FIG. 2 and FIG. 3C, the second coil piece 4 has a middle bar portion 4a, a first bent portion 4b continuous from the one end of the middle bar portion 4a, and bent in one direction in the circumferential direction CIR (a bent part and a straight bar part), a second bent portion 4c continuous from another end of the middle bar portion 4a, and bent in another direction in the circumferential direction CIR (bent parts and straight bar parts in zigzag shape), a third joint portion 4d formed at a leading end of the first bent portion 4b, and a power-feeding-terminal connecting portion 4e formed at a leading end of the second bent portion 4c with a straight portion 4h. The second coil piece 4 is formed of an aluminum alloy (or aluminum), has a joint through-hole 4f formed at the third joint portion 4d in the thickness direction, and a joint through-hole 4g which is formed at the power-feeding-terminal connecting portion 4e in the thickness direction (in the axial direction X) and which is to be connected to the bus bar 51 as a power feeding terminal.

As shown in FIGS. 3C and 3D, the second coil piece 4 is so formed as to have a width wd greater than a thickness t of the second coil piece 4. The second coil piece 4 has the middle bar portion 4a linearly formed so that the middle bar portion 4a is arranged so as to extend from the center of the base member 2 (center of rotation C) in the radial direction RD. The second coil piece 4 has the first bent portion 4b and the second bent portion 4c respectively bent in opposite directions in the circumferential direction CIR at a predetermined angle. As shown in FIG. 6, the bending angles and lengths of the first bent portion 3b of the first coil piece 3 and the second bent portion 3c are set such that a pair of the second coil pieces 4 on reverse and right face of the base member 2 are connected together makes the angle θ when viewed from the center C of rotation (each of the first and second coil pieces 3 and 4 make the angle θ/2 when viewed from the center C of rotation). That is, the angle θ is set in such that S- and N-magnetic poles of a non-illustrated rotor used together with have the same angular positions in the circumference direction CIR similarly to the first coil pieces 3.

The power-feeding-terminal connecting portion 4e of the second coil piece 4 is so formed as to be located more inwardly than the position of the second joint portion 3e of the first coil piece 3 when arranged on the base member 2 with respect to the center C. The power-feeding-terminal connecting portion 4e has a larger diameter than that of the second joint portion 3e of the first coil piece 3.

As shown in FIGS. 3A and 3C, because the first coil piece 3 and the second coil piece 4 can be individually formed as a single piece, those can be manufactured by a press work (notching press, turret punch press, servo press, charge press, fine blanking press, and the like), and do not need a cut process while the stator coil 1 is manufactured, resulting in absence of a cause of contamination.

As shown in FIGS. 1 and 2, the base member 2 is an annular plate formed of an insulating material like a synthesis resin. The base member 2 has a one-side first recess (groove) 7 which is formed along the circumferential direction CIR in one face (front face), a one-side second recess (groove) 8, and a magnetic-flux-transfer-member through-hole 9. The base member 2 also has an another-side first recess 7A which is formed along the circumferential direction CIR in another face (reverse face), and an another-side second recess 8A. The base member 2 further has a positioning hole 10 for guiding and a stacking bolt hole 11 formed at the inner periphery edge and the outer periphery edge.

Figure 4:
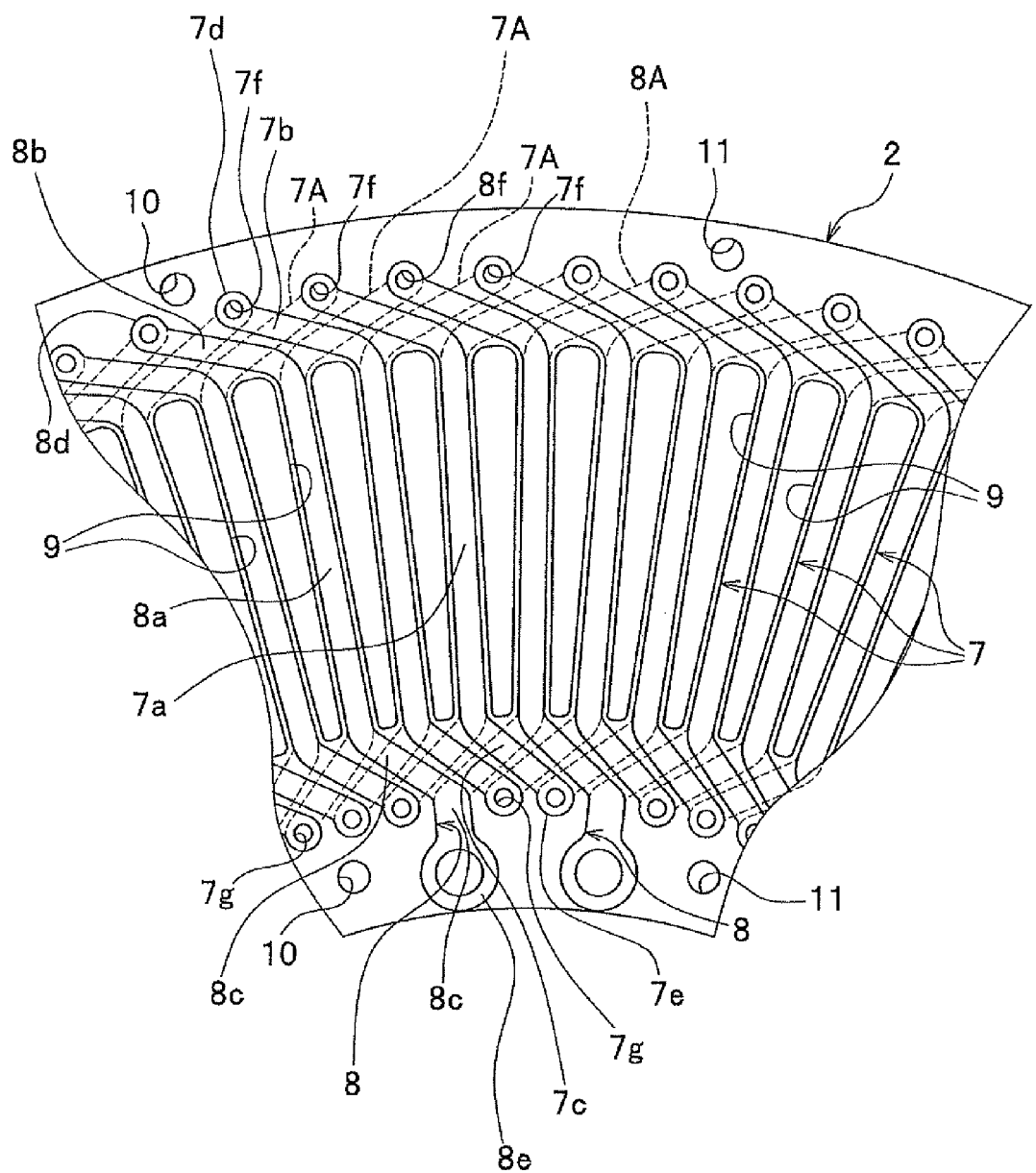
FIG. 4 is a plane view exemplary showing a part of a base member used in the stator coil for an axial gap electrical rotating machine.

As shown in FIGS. 1, 2, and 4, the one-side first recess 7 and the one-side second recess 8 are for arranging the first coil piece 3 and the second coil piece 4 therein, and are formed so as to extend in the circumferential direction CIR with a predetermined interval. As shown in FIG. 1, the base member 2 has six one-side second recesses 8 at predetermined positions, and the remaining positions are all one-side first recesses 7.

As shown in FIG. 2, the one-side first recess 7 and the one-side second recess 8 are formed in the thickness direction of the base member 2, and are respectively formed in shapes corresponding to the first coil piece 3 and the second coil piece 4 with the central portion of the base member 2 in the thickness direction being as a bottom face. The one-side first recess 7 and the one-side second recess 8 respectively have through-holes at portions necessary for a connection. In the embodiment, through-holes 7f, 7g, and 8f are formed such positions that the through-holes 7f, 7g, and 8f face the joint through-hole 3f of the first joint portion 3d of the first coil piece 3 and the joint through-hole 3g of the second joint portion 3e, and a portion facing the joint through-hole 4f of the third joint portion 4d of the second coil piece 4.

The one-side first recess 7 has a central recess 7a which corresponds to the middle bar portion 3a of the first coil piece 3, and which is formed so as to be linear from the center of the base member 2 (center of rotation C) in a radial direction RD, a first bent recess 7b and a second bent recess 7c which are continuous from one end of the central recess 7a and another end thereof, respectively, and which are recessed so as to allow the first bent portion 3b of the first coil piece 3 and the second bent portion 3c thereof to be fitted therein, respectively, and a first joint recess 7d and a second joint recess 7e which are formed at respective leading ends of the first bent recess 7b and the second bent recess 7c, and which are recessed so as to allow the first joint portion 3d of the first coil piece 3 and the second joint portion 3e thereof to be fitted therein, respectively.

The through-holes 7f, 7g are formed in the first joint recess 7d and the second joint recess 7e at respective positions communicated with the joint through-holes 3f, 3g formed in the first joint portion 3d of the first coil piece 3 and the second joint portion 3e thereof.

The one-side second recess 8 has a central recess 8a which corresponds to the middle bar portion 4a of the second coil piece 4, and which is formed so as to be linear from the center of the base member 2 (center C of rotation) in a radial direction RD, a first bent recess 8b and a second bent recess 8c which are continuous from one end of the central recess 8a and another end thereof, respectively, and which are recessed so as to allow the first bent portion 4b of the second coil piece 4 and the second bent portion 4c thereof to be fitted therein, respectively, and a joint recess 8d and a power feeding terminal recess 8e which are formed at respective leading ends of the first bent recess 8b and the second bent recess 8c, and which are recessed so as to allow the third joint portion 4d of the second coil piece 4 and the power-feeding-terminal connector 4e thereof to be fitted therein, respectively. The through-hole 8f is formed in the joint recess 8d at a position communicated with the joint through-hole 4f formed in the third joint portion 4d of the second coil piece 4.

Note that because the one-side first recess 7 and the one-side second recess 8 have the same structure as those of the another-side first recess 7A and the another-side second recess 8A, respectively, explanation for those recesses 7A, 8A are omitted. The positional relationships between the one-side first recess 7 and the one-side second recess 8, and between the another-side first recess 7A and the another-side second recess 8A are as follow:

In the base member 2, the middle bar portion 3a of the first coil piece 3 and the middle bar portion 4a of the second coil piece 4 are located at the same position between front face and the reverse face so as face each other between the front and reverse face (see FIG. 6).

The one-side first recess 7 and the another-side first recess 7A are arranged in such that the first bent portion 3b and the second bent portion 3c on the front face are arranged in opposite directions in the circumferential direction CIR to the first bent portion 3b and the second bent portion 3c on the rear face of the base member 2. The one-side second recess 8 and the another-side second recess 8A are also arranged in such that the first bent portion 4b on the front face and the second bent portion 4c on the front face are arranged in opposite directions in the circumferential direction CIR to the first bent portion 4b and the second bent portion 4c on the rear face of the base member 2. In other words, the recesses 7 and 8 on one of the two sides of the base member 2 hold the first and second coil pieces 3 and 4 so as to orient the first and second bent portions 3b, 3c, 4b, and 4c in the circumferential direction CIR, and the recesses 7 and 8 on the other of the two sides of the base member 2 hold the first and second coil pieces 3 and 4 so as to orient the first and second bent portions 3b, 3c, 4b, and 4c in an opposite direction of the circumferential direction CIR. In order to use three phases: the U-phase; the V-phase; and the W-phase, the first joint recess 7d is formed in such that the first joint portion 3d of the first coil piece 3 arranged on one-side face faces the first joint portion 3d of the first coil piece 3 which is the third one left from the former first coil piece 3 in the circumferential direction CIR and which is arranged on another-side face with the middle bar portion 3a being as a center.

The second joint recess 7e is formed in such a way that the second joint portion 3e of the first coil piece 3 arranged on one-side face (front face) faces the second joint portion 3e of the first coil piece 3 which is the third one right from the former first coil piece 3 in the circumferential direction CIR and which is arranged on another-side face with the middle bar portion 3a being as a center C. Note that the bent angles of the first bent recesses 7b, 8b and the second bent recesses 7c, 8c are set based on the same reason as that explained with the structure of the first coil piece 3 and the second coil piece 4.

In the stator coil 1, with the first coil pieces 3 and the second coil pieces 4 being arranged on the base member 2, the first joint portions 3d, the second joint portions 3e, and the third joint portions 4d are positioned so as to face each other between the rear and front faces are respectively joined together by joint pins 5 which are an interlayer connection portion via the through-holes 7f, 7g, and 8f. Note that a layer means one side (one-side face or another-side face) of the base member 2.

The joint pin 5 is for joining ones facing one another between the rear and front faces in the first joint portion 3d and the second joint portion 3e of the first coil piece 3 and in the third joint portion 4d of the second coil piece 4. The joint pin 5 is formed in a cylindrical shape which can be fitted into the joint through-holes 3f, 3g, and 4f of the first joint portion 3d, the second joint portion 3e, and the third joint portion 4d, respectively, and is formed of the same material as those of the first and second coil pieces 3, 4.

For example, when the first and second coil pieces 3, 4 are formed of an aluminum alloy, it is desirable that the joint pin 5 should be formed of the same aluminum alloy. With the first coil piece 3 and the second coil piece 4 being respectively arranged in the one-side first recess 7, the one-side second recess 8, the another-side first recess 7A, and the another-side second recess 8A of the base member 2, the joint pin 5 are processed by a joining apparatus 40 to be discussed later, and is so arranged to join the first joint portion 3d, the second joint portion 3e, and the third joint portion 4d facing one another via the through-holes 7f, 7g, and 8f.

Figure 5:
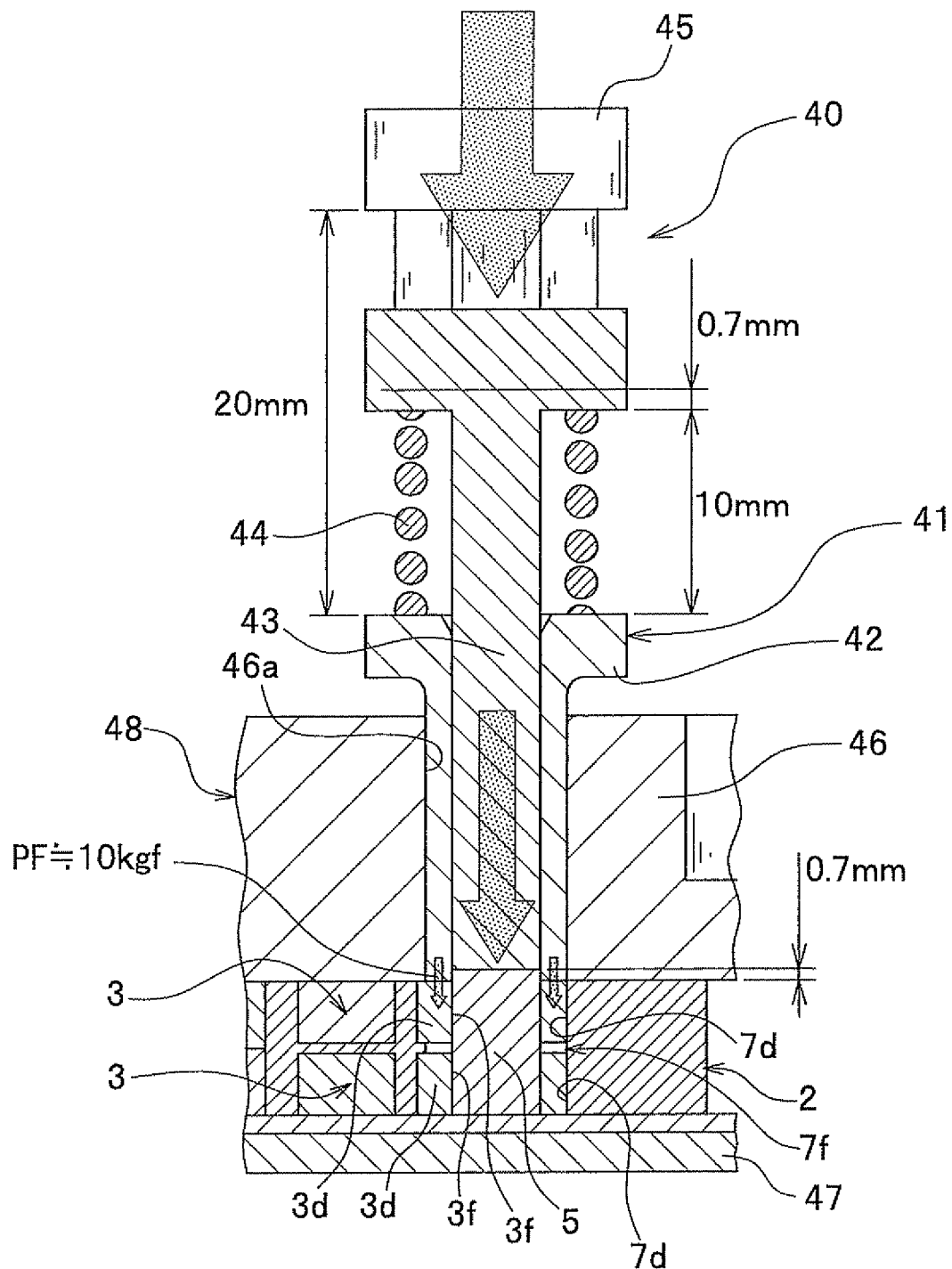
FIG. 5 is a cross-sectional view exemplary showing how a first joint portion and a second joint portion of a first coil piece and a third joint portion of a second coil piece in the stator coil for an axial gap electrical rotating machine are joined together.

The joint pin 5 used in the embodiment is fixed by, for example, the joining apparatus 40 shown in FIG. 5, so as to join the first joint portion 3d, the second joint portion 3e, and the third joint portion 4d together. FIG. 5 is a cross-sectional view exemplary showing how the first joint portions 3d and the second joint portions 3e of the first coil pieces 3 and the third joint portions 4d of the second coil pieces 4 in the stator coil 1 for an axial gap electrical rotating machine are joined together by the joining apparatus 40.

The joining apparatus 40 includes a guide plate 48 comprising a one-side guide plate 46 and an another-side guide plate 47, and a press member 41 which fits the joint pin 5 into the first coil piece 3 and the second coil piece 4 in the base member 2, with the first coil piece 3 and the second coil piece 4 being sandwiched between the guide plates 46, 47.

The guide plate 48 has a pin fitting hole 46a formed in a portion of the one-side guide plate 46 where the joint pin 5 is to be arranged, and the pin fitting hole 46a passes all the way through such portion.

The press member 41 has a cylindrical press hammer guide 42 which is to be inserted into the pin fitting hole 46a of the one-side guide plate 46, a press hammer 43 which pushes the joint pin 5 along the internal wall of the press hammer guide 42 with a give stroke of 20 mm, a support spring 44 which supports the press hammer 43, and a pushing member 45 which pushes the press hammer 43 against the elastic force of the support spring 44.

An explanation will be given of how to use the joining apparatus 40 to insert the joint pin 5. First, the base member 2 on which the first coil piece 3 and the second coil piece 4 are arranged is fixed between the one-side guide plate 46 and the another-side guide plate 47, and is guided by the guide plate 48.

Next, the press hammer guide 42 of the press member 2 is inserted into the pin fitting hole 46a of the one-side guide plate 46 relative to the base member 2 guided by the guide plate 48. As the press hammer guide 42 is inserted, a thick part of the press hammer guide 42 in the radial direction abuts an upper face of the first joint portion 3d, and a leading end of the press hammer 43 abuts one end of the joint pin 5.

Thereafter, by pushing the press hammer 43 by the pushing member 45, the press hammer 43 is pushed with a pressing force PF of 10 Kgf against the elastic force of the support spring 44 through a compression stroke of 10 mm with a play in a pressing stroke of 0.7 mm, and the joint pin 5 is pressed. Accordingly, one end of the joint pin 5 is pushed, the joint pin 5 is fitted into the joint through-holes 3f, 3f, and a portion abutting the press hammer 43 is crushed through a crushing stroke of 0.7 mm. Therefore, the first joint portion 3d is caulked and joined together with the (facing) first joint portion 3d in an opposing direction. By successively performing such operation on the inner periphery part of the base member 2 and the outer periphery part thereof, the first joint portion 3d, the second joint portion 3e, and the third joint portion 4d are joined together with the first joint portion 3d, the second joint portion 3e, and the third joint portion 4d, respectively, latter three of which are arranged in an opposite direction (opposite face).

As shown in FIG. 2, the magnetic flux transfer member 6 can be formed of an iron-based material which is widely used as a core material, but in order to enhance a conversion efficiency between electric energy and magnetic energy and to improve a magnetic flux transfer efficiency, it is desirable to use a grain oriented electrical steel sheet which is likely to be magnetized only in one direction. The magnetic flux transfer member 6 is formed in a sectoral shape in a planer view, and has a portion which is a width greater than the width of the middle bar portion 3a of the first coil piece 3 and that of the middle bar portion 4a of the second coil piece 4. Note that the magnetic flux transfer member 6 is inserted into the magnetic-flux-transfer-member through-hole 9 in the base member 2 with intervention with a non-illustrated insulating collar. The magnetic flux transfer member 6 comprises a slot core (not shown) which is integral with a non-illustrated return path (returning magnetic path of magnetic flux). The magnetic flux transfer member 6 is fixed to a casing by bolt together with the stacked stator coils 1.

As the first coil piece 3, the second coil piece 4, and the magnetic flux transfer member 6 are arranged on the base member 2 and predetermined portions are connected together by the joint pins 5, for example, the terminal member 50 shown in FIG. 1 is connected in order to provide an external connection. As shown in FIG. 1, the terminal member 50 has bus bars 51, 52 sandwiching the power-feeding-terminal connecting portion 4e of the second coil piece 4 via bolts 54, a terminal block 53 connected thereto, and a terminal cover 55 covering those. Note that a non-illustrated insulating sheet is provided so that facing portions of individual base members 2, 2 and 2 do not contact with each other.

The power-feeding-terminal connecting portions 4e arranged at one-side face of the middle base member 2 and at another-side face of the upper base member 2 are connected together via a connecting washer 61 formed in an annular shape. Likewise, the power-feeding-terminal connecting portions 4e arranged at another-side face of the middle base member 2 and at one-side face of the lower base member 2 are connected together via the connecting washer 61 formed in an annular shape.

When three base members 2 are used as a single unit, the second coil pieces 4 have two power-feeding-terminal connecting portions 4e at one side, and two power-feeding-terminal connecting portions 4e at anther side in one base member 2, and in each of the U-phase, the V-phase, and the W-phase. That is, in one base member 2, there are six power-feeding-terminal connecting portions 4e at one side, and six power-feeding-terminal connecting portions 4e at another side in all of the U-phase, the V-phase, and the W-phase. For example, in the U-phase, the power-feeding-terminal connecting portions 4e adjoining with each other and arranged on one-side face and on another-side face, respectively, are connected together, and the adjoining power-feeding-terminal connecting portions 4e arranged on one-side face and on another-side face are used as an input terminal and an output terminal, respectively.

In the embodiment, as shown in FIG. 6, the explanation is given of a case where three base members 2 are used as a single unit, for example, when the power-feeding-terminal connecting portions 4e, 4e arranged at another-side face of the lower-layer base member 2 are used as an input terminal and an output terminal, respectively, then the connection relationship becomes as follows:

As shown in FIG. 6, the power-feeding-terminal connecting portions 4e, 4e at one-side face of the lower-layer base member 2 and the power-feeding-terminal connecting portions 4e, 4e at another-side face of the middle-layer base member 2 are connected together via the connecting washer 61. Moreover, the power-feeding-terminal connecting portions 4e, 4e at one-side face of the middle-layer base member 2 are connected together with the power-feeding-terminal connecting portions 4e, 4e at another-side face of the upper-layer base member 2 via the connecting washer 61.

The power-feeding-terminal connecting portions 4e, 4e, adjoining with each other in the circumferential direction CIR at one-side face of the upper-layer base member 2 are connected together by the bus bar 51 (see FIG. 1) to form a predetermined coil loop. Note that the first coil piece 3 and the second coil piece 4 facing with each other in the upper, middle, and lower base members 2 are insulated by a non-illustrated insulating sheet (except the power-feeding-terminal connecting portion 4e). The power-feeding-terminal connecting portions 4e, 4e arranged at one-side face and another-side face in each individual base member 2 are also insulated from each other.

More specifically, there are first to third types of power-feeding-terminal connecting portions. The first type of the connecting portions are connected to each other on one side of the base member, the second type of the connecting portion are connected to each other on two adjoining base members, and the third type of the power feeding terminals are supplied with power.

As shown in FIG. 6, a coil loop of the stator coil 1 is formed as follow by connection of the first coil pieces 3 and the second coil pieces 4 arranged on the upper, middle, and lower base members 2. Note that FIG. 6 schematically shows a flow of a current only for the U-phase.

When power is supplied to a left input power-feeding-terminal connecting portion 4e at another-side face of the lower-layer base member 2, a current flows through the first coil pieces 3 and the second coil pieces 4 on both one-side face and another-side face of the lower-layer base member 2 in a clockwise direction (of CIR). When the current flows in the clockwise direction and reaches the left power-feeding-terminal connecting portion 4e on one-side face of the lower-layer base member 2, the current is transferred to the left power-feeding-terminal connecting portion 4e at another-side face of the middle-layer base member 2 through the washer 61, and flows in the clockwise direction through the first coil pieces 3 and the second coil pieces 4 on one-side face and another-side face of the middle-layer base member 2.

The current is transferred from the middle-layer base member 2 to the upper-layer base member 2, and likewise flows through. The current flows in the clockwise direction through the first coil pieces 3 and the second coil pieces 4 of the upper-layer base member 2, and reaches the power-feeding-terminal connecting portion 4e (just above the power-feeding-terminal connecting portion 4e where the power is supplied to this layer) at one-side face of the base member 2. This causes a current to flow to the right power-feeding-terminal connecting portion 4e adjoining in the circumferential direction CIR, and the current flows in a counterclockwise direction through the first coil pieces 3 and the second coil pieces 4 in the upper-layer base member 2. Further, the current flows in the counterclockwise direction in the upper-layer base member 2, and reaches the right power-feeding-terminal connecting portion 4e at another-side face of the upper-layer base member 2. The current is then transferred to the middle-layer base member 2, flows in the counterclockwise direction likewise the upper-layer base member 2, and is transferred to the lower-layer base member 2 through the power-feeding-terminal connecting portion 4e. The current which reaches the lower-layer base member 2 flows in the counterclockwise direction, reaches the right power-feeding-terminal connecting portion 4e at another-side face of the lower-layer base member 2, and is outputted.

As the explanation has been given of the flow of the current with reference to FIG. 6, formed in the stator coil 1 is a coil loop in which the current input into the left power-feeding-terminal connecting portion 4e of the lower-layer base member 2 flows in the clockwise direction in the lower, middle, and upper base members 2 in this order, flows in the counterclockwise direction in the upper, middle, and lower base members 2 in this order, and is output from the right power-feeding-terminal connecting portion 4e of the lower-layer base member 2.

Note that the stator coil 1 has the base member 2 on which the first coil pieces 3 and the second coil pieces 4 are arranged, the first joint portions 3d, the second joint portions 3e, and the third joint portions 4d in the direction facing one another are respectively joined together by the joint pin 5, and the power-feeding-terminal connecting portions 4e are connected in the foregoing fashion. The stator coil 1 has three base members 2 stacked one another via a non-illustrated insulating sheet, positioning pins 10A are inserted into respective positioning holes 10 for guide formed in the outer periphery edge of the base member 2 and the inner periphery edge thereof in the circumferential direction CIR with predetermined intervals, and bolts B are inserted into respective stacking bolt holes 11, and are fastened with respective nuts N. When individual power-feeding-terminal connecting portions 4e are connected, as shown in FIG. 1, input/output connections of power are established by the bus bar 51, adjoining power-feeding-terminal connecting portions 4e are connected by the bus bar 52, and a connection between base members 2 are established by connecting washers 61.

Next, an explanation will be given of an operation and an effect of the stator coil 1 of the embodiment with reference to FIGS. 1 and 6. As alternating currents are supplied to respective power-feeding-terminal connecting portions 4e connected to a power feeding terminal of the stator coil 1, coil loops of three phases: the U-phase; the V-phase; and the W-phase (FIG. 6 shows the U-phase only) are conducted.

In the first coil piece 3 and the second coil piece 4 of the same phase, the currents flow in the same direction (direction toward the outer periphery or direction toward the inner periphery) through the middle bar portions 3a, 4a of the same phase at the same location in the circumferential direction CIR on both faces, and the directions of the magnetic fluxes generated by the currents become coincident, so that magnetic fields are generated so as to be enhanced with each other.

Because the magnetic flux transfer members 6 are arranged at positions adjacent to the first coil piece 3 and the second coil piece 4, the magnetic flux passes through the magnetic flux transfer member 6, and is transferred to a non-illustrated rotor to form a magnetic flux loop.

Further, because the magnetic flux transfer member 6 is inserted into the magnetic-flux-transfer-member through-hole 9 formed in the base member 2, the stiffness of the stator coil 1 can be improved.

Furthermore, because the magnetic flux is transferred from the magnetic flux transfer member 6 to the non-illustrated rotor, eddy currents generated in the first coil piece 3 and the second coil piece 4 (conductive bodies) can be significantly reduced.

Figure 7:
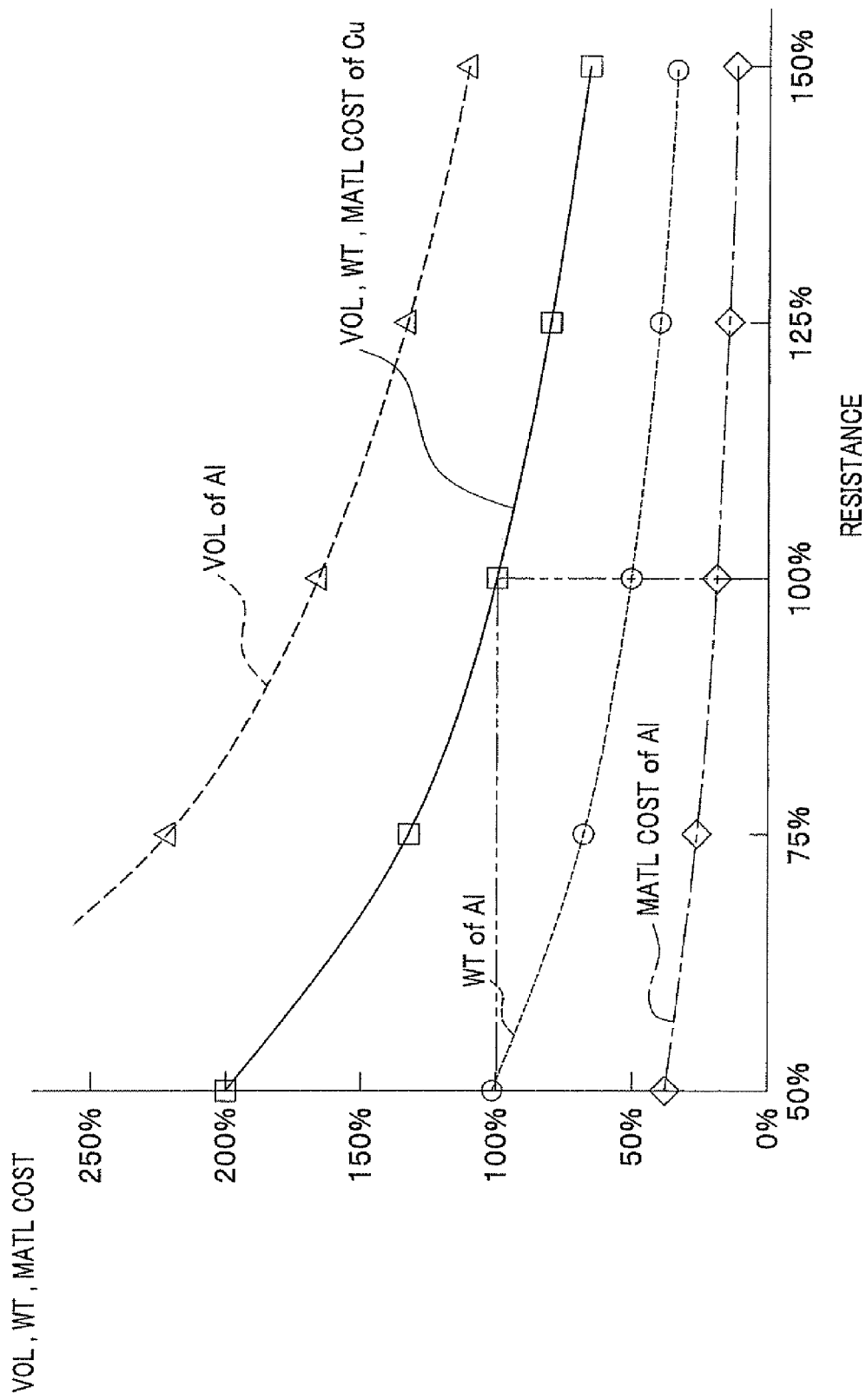
FIG. 7 is a graph showing a relationship among a resistance, a volume, a weight, and a material cost with respect to aluminum when the materials of the first and second coil pieces in the stator coil for an axial gap electrical rotating machine are selected with reference to copper.

An explanation will be given of a relationship among a resistance, a volume, a weight, and a material cost to compare the case when the first and second coil pieces 3, 4 are formed of aluminum (or aluminum alloy) with the case where when the first and second coil pieces 3, 4 are formed of copper (or copper alloy) in the stator coil 1 with the foregoing structure with reference to FIG. 7. FIG. 7 is a chart showing a relationship among a resistance, a volume, a weight, and a material cost of aluminum when the materials of the first and second coil pieces 3, 4 in the stator coil 1 for an axial gap electrical rotating machine with reference to copper (note that materials explained in FIG. 7 are based on assumptions in the cases of pure aluminum and pure copper).

As shown in FIG. 7, if it is assumed that the resistances of the first and second coil pieces 3, 4 formed of copper are 100%, when a volume of aluminum, a weight of aluminum, and a material cost of aluminum are compared, for example, a volume of aluminum is 170% relative to copper when the resistance of copper is 100%, and this indicates that a contour should become large. A weight of aluminum in this case is about 50% relative to copper, and a material cost is merely 20% relative to copper, and is inexpensive. Accordingly, when the stator coil 1 is manufactured, the range of selection of the material becomes wide in this case. Therefore, it is possible to select the materials of the first and second coil pieces 3, 4 in consideration of an area of a place where the stator coil 1 can be disposed, a cost, and the like, and to provide the stator coil 1 while flexibly coping with the need of a product.

Figure 13A:
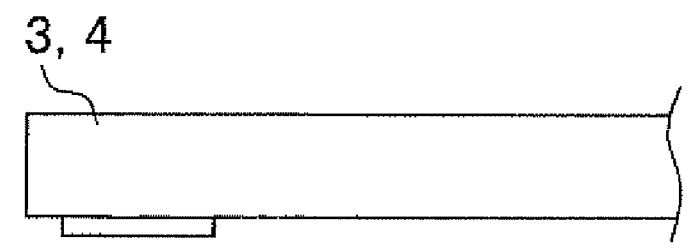
FIGS. 13A and 13B are side views of the first and second coil pieces connected by ultrasonic joining.
Figure 13B:
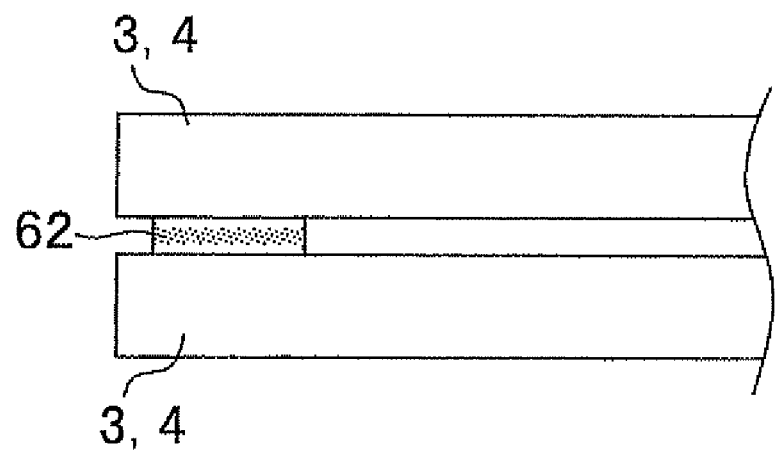

In a conventional structure in which the number of turns in the circumferential direction CIR is increased like U.S. Pat. No. 3,159,764, because the more the number of turns is, the smaller the conductor width in the circumferential direction CIR becomes, aluminum cannot be used from the standpoint of strength. That is, when aluminum is used in the conventional structure, from the standpoint of the strength of a material, work of winding a wire, or a formation of winding, and a conservation of the shape thereof become difficult. Furthermore, because an oxide film of aluminum is hard, connection of an end portion of a winding becomes difficult, so that an aluminum conductor is hardly used in the conventional structure. In comparison with such conventional structure, according to the structure of the present invention, however, a piece form which facilitates consideration of strength is employed, resulting in improvement of the degree of freedom for selection of the conductor material. Moreover, coil pieces can be joined together by various techniques, such as caulking, and ultrasonic joining, so that an oxide film does not become a matter, and thus an aluminum material can be used. FIGS. 13A and 13B show the first and second coil pieces 3, 4 to be processed by an ultrasonic joining. In FIG. 13A, the first coil pieces 3 (4) are faced with each other and then contacted. In this condition, ultrasonic waves are applied to connect the first coil pieces 3 (4). FIG. 13B shows an ultrasonic joining layer 62 as interlayer connection portion to joint the first coil 3 to another first coil piece 3 or a second coil piece 4, wherein the first to third joint portions 3d 3e and 4d and 4e may be not rings, but discs.

Figure 8A:
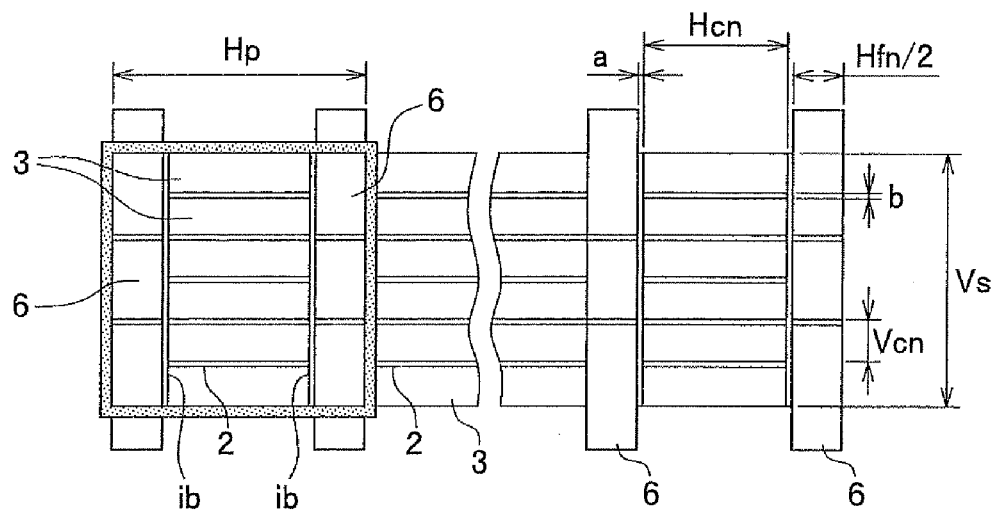
FIG. 8A is an exemplary diagram showing a predetermined occupancy space of a coil in the stator coil of the present invention.
Figure 8B:
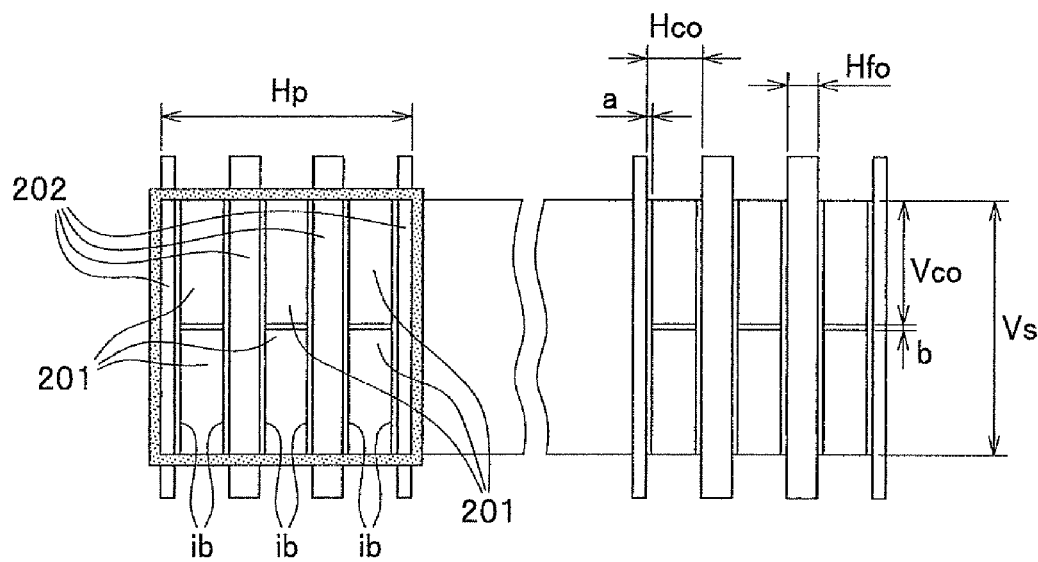
FIG. 8B is an exemplary diagram showing a predetermined occupancy space of a coil in a conventional stator coil.

As shown in FIGS. 8A and 8B, the stator coil 1 as explained above has following advantages in comparison with the conventional structure in which the number of turns is increased in the circumferential direction CIR. FIG. 8A is an exemplary diagram showing a predetermined occupancy space of a coil in the stator coil of the present invention. FIG. 8B is an exemplary diagram showing a predetermined occupancy space of a coil in the conventional stator coil.

As shown in FIGS. 8A and 8B, when the structure of the present invention is compared with the structure of the conventional technology at the same portion of the occupancy space (volume) of a coil, two insulated portions ib are needed in the case of FIG. 8A, while six insulated portions ib are needed in the case of FIG. 8B. In the case of FIG. 8B, because an aspect ratio at a portion where the insulated portion ib is provided becomes large, it becomes clear that the structure of FIG. 8A is superior with a surface where the insulated portion ib is formed. Further, according to the structure of FIG. 8A, the magnetic flux transfer member 6 arranged at the right and the left of the coil can be thick, so that the structure of FIG. 8A can have a larger magnetic flux amount in comparison with the structure of FIG. 8B.

In the structure of FIG. 8A, because the coils are arranged in the stacking direction, in comparison with the structure of FIG. 8B in which the coils are arranged in the circumferential direction CIR, the percentage of the insulated portions ib in the occupancy space is 19.7% in the structure of FIG. 8A, and is 35.8% in the structure of FIG. 8B. Accordingly, the structure of FIG. 8A needs only about a half of the insulated portions ib relative to the structure of the FIG. 8B, so that the structure of FIG. 8A can increase the ratio of the occupancy space of the coil.

In the structure of FIG. 8A, if a distance between the magnetic flux transfer member 6 at one end and the magnetic flux transfer member 6 at another end is Hp and a height of the stacked coils is Vs, when foregoing both structures are compared with each other with the occupancy rate of the conductor in a space defined by Hp and VS being coincident, it does not affect to the number of turns (T) in the structure of FIG. 8A (Hcn=Hp−Hfn−2·a). Conversely, in the structure of FIG. 8B, if a distance between the left magnetic flux transfer member and the right magnetic flux transfer member is Hp and a distance between the uppermost coil and the lowermost coil in the stacking direction is Vs, the number of turns (T) is affected by such a structure (Hco=2·(Hp−(T/2)·Hfo−T·a)/T).

Moreover, the thickness of the magnetic flux transfer member 6 in the structure of FIG. 8A does not affect to the number of turns (T) (Hfn$_{total}$=Hp−Hcn−2·a), while it affects to the number of turns (T) in the structure of FIG. 8B (Hfo$_{total}$=Hp−T·(Hco/2+a)).

Regarding the thickness (variation) in the direction in which the coils are stacked, it affects to the number of turns (T) of a coil (Vcn=(Vs−(T−1)·b)/T), and it does not affect to the number of turns (T) in the structure of FIG. 8B.

Note that Hcn is a width of a coil, Vcn is a height (thickness) of coil, b is a width of an insulating material of a coil in the stacking direction, a is a formation width of an insulated portion ib, and Hfn is a width of a magnetic flux transfer member within a specific surface in FIG. 8A. In FIG. 8B, Hco is a width of a coil, Vco is a height (thickness) of a coil, b is a width of an insulating material of a coil in the stacking direction, a is a formation width of an insulated portion ib, and Hfo is a width of a magnetic flux transfer member within a specific surface in FIG. 8B.

As explained above with reference to FIGS. 1 to 8, according to the stator coil 1 of the present invention, it is possible to increase the number of turns in the stacking direction of the base members 2, insulated portions between the first coil piece 3 or the second coil piece 4 and the base member 2 can be significantly reduced in comparison with the structure in which the number of turns of a coil is increased in the circumferential direction CIR, resulting in improvement of the insulation reliability.

<Modification of Coil Piece>

The first and second coil pieces 3, 4 used in the stator coil 1 can employ as modified structures shown in FIGS. 9A to 9C. FIGS. 9A to 9F are plane and side views showing other structures of a first coil piece used in the stator coil 1. The same structural portion explained with reference to FIG. 3A will be denoted by the same reference numeral, and the explanation thereof will be omitted.

As shown in FIGS. 9A and 9B, a first coil piece 13 has the long middle bar portion 3a, the first bent portion 3b and the second bent portion 3c continuous from one end of the middle bar portion 3a and another end thereof, respectively, a first joint portion 13d formed at a leading end of the first bent portion 3b, and a second joint portion 13e formed at a leading end of the second bent portion 3c. The first joint portion 13d of the first coil piece 13 and the second joint portion 13 thereof have the same width and thickness as those of the first bent portion 3b and the second bent portion 3c, respectively, and have a leading end formed in a circular arc shape. The joint through-holes 3f, 3g are respectively formed therein. According to the first coil piece 13, because the first joint portion 13d and the second joint portion 13e have a width which does not largely differ from that of the first bent portion 3b and the second bent portion 3c, there is no portion where stress is concentrated, resulting in achievement of a high strength.

As shown in FIGS. 9C and 9D, a first coil piece 23 has a difference from the structure of FIGS. 9A and 9B that a first joint portion 23d and a second joint portion 23e have a greater thickness than the middle bar portion 3a. The other structural portions are same as those of FIGS. 9A and 9B. According to the first coil piece 23, because the first joint portion 23d and the second joint portion 23e are thick, the strength is further improved.

As shown in FIGS. 9E and 9F, a first coil piece 33 has a recess engagement portion 33f and a protrusion engagement portion 33h as interlayer connection portions at a first joint portion 33d on the front and rear faces thereof, and a recess engagement portion 33g and a protrusion engagement portion 33i as interlayer connection portions at a second joint portion 33e on the front and rear faces thereof. The protrusion engagement portion 33h of the first joint portion 33d or the protrusion engagement portion 33i of the second joint portion 33e is engaged with the joint through-hole 3f of the flat first joint portion 13d of the first coil piece 13 shown in FIG. 9A or the joint through-hole 3g of the second joint portion 13e, respectively, and is electrically connected thereto. The joint pin 5 becomes unnecessary because the first coil piece 33 has the convex engagement portions 33h, 33i, resulting in reduction of the number of parts.

It is not illustrated in the figure, but when the first coil piece 33 is used, if the third joint portion 4d of the second coil piece 4 has the same structure as that of the first joint portion 33d of the first coil piece 33 shown in FIGS. 9E and 9F, a connection work can be facilitated.

Note that the first coil piece 33 does not need the joint pin 5, and can be joined together with the first coil piece 3, 13, 23 shown in FIG. 2, FIGS. 9A, 9B, 9C, and 9D (or the third joint portion of the second coil piece 4) via the protrusion engagement portions 33h, 33i, or can be combined with other structures.

The explanation has been given of the structures of the first coil pieces 13, 23, and 33 with reference to FIGS. 9A to 9F, but the third joint portion 4d of the second coil piece 4 may employ the same structure as that of the first joint portion 13d, 23d, 33d of the first coil piece 13, 23, 33. When the first coil piece 13, 23, 33 and such a second coil piece 4 are used together, the same type of those can be used together, but different types thereof can be also combined together.

<Modification of Base Member>

Figure 10:
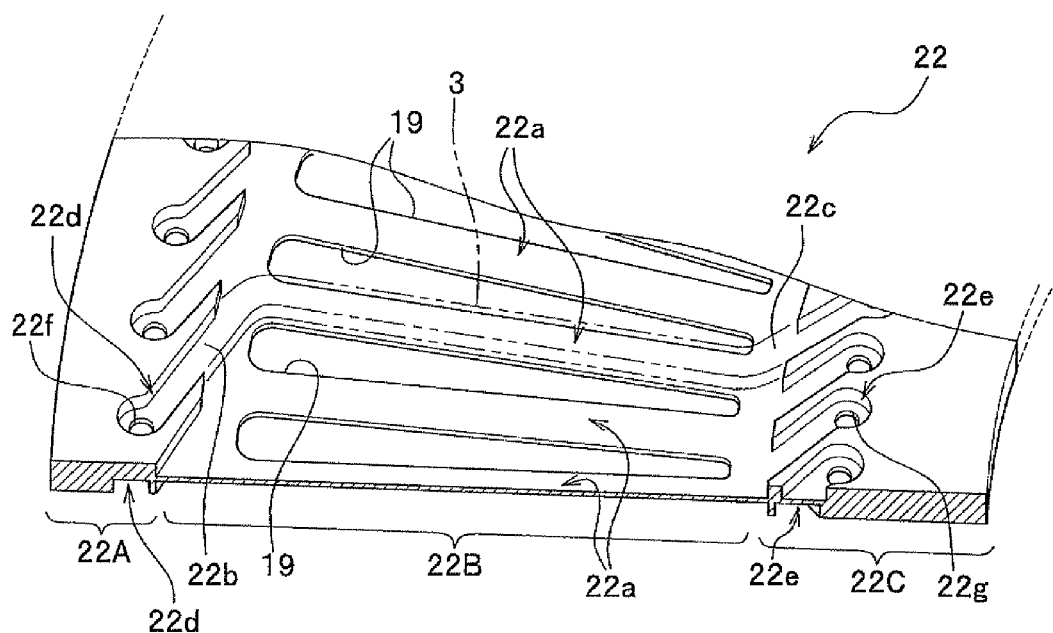
FIG. 10 is a perspective view exemplary showing another structure of a base member in a cross section with a part of the base member being omitted.

The base member 2 having the structure shown in FIGS. 1 to 6 can employ a modified structure shown in FIG. 10. FIG. 10 is a perspective view exemplary showing another structure of the base member in a cross section with a part of the base member being omitted. The same structural portions on both faces of a base member 22 as those of the base member 2 will be denoted by the same reference numerals. Regarding a recess for the second coil piece, a recess for the power-feeding-terminal connecting portion differs but the other structural portion is same as a recess for the first coil piece, so that the explanation thereof will be omitted.

As shown in FIG. 10, the base member 22 has the recesses 7, 7A, 8, and 8A at one-side face and another-side face for the first coil piece 3 and the second coil piece 4 like the structure shown in FIG. 1, but has a difference that there is no partition wall for the magnetic flux transfer member 6 adjacent to the first coil piece 3 and the second coil piece 4.

That is, the base member 22 is formed in an annular shape, and has a one-side first joint recess 22d, one-side central support portion 22a, and one-side second joint recess 22e in the circumferential direction CIR at an outer periphery area 22A, a center area 22B, and an inner periphery area 22C on one side, respectively. The base member 22 also has another-side first joint recess 22d, another-side central support portion 22a, and another-side second joint recess 22e in the circumferential direction CIR at the outer periphery area 22A, the center area 22B, and the inner periphery area 22C on another side, respectively.

The one-side first joint recess 22d which is for the first coil piece 3 is recessed so as to engage all of or a part of the first bent portion 3b of the first coil piece 3 with the first joint portion 3d of another first coil piece 3. The one-side first joint recess 22d has a through-hole 22f which passes all the way therethrough, and which is communicated with the joint through-hole 3f of the first joint portion 3d of the first coil piece 3.

The one-side central support portion 22a is so formed as to be lower than the top face of the base member 22 at one side, and is formed in a plane where the middle bar portion 3a of the first coil piece 3 is disposed. The one-side central support portion 22a has a first disposing face 22b which is formed at one end of the one-side central support portion 22a and on which all of or a part of the first bent portion 3b of the first coil piece 3 is disposed, and has a second disposing face 22c which is formed at another end of the one-side central support portion 22a and on which all of or a part of the second bent portion 3c of the first coil piece 3 is disposed. At a portion where the one-side central support portions 22a adjoin with each other in the circumferential direction CIR, a magnetic-flux-transfer-member through-hole 19 for accommodating the magnetic flux transfer member 6 is formed at a predetermined interval. Therefore, the magnetic-flux-transfer-member through-hole 19 and a plane of the one-side central support portion 22a are alternately formed in the circumferential direction CIR at the center area 22B.

The one-side second joint recess 22e is recessed so as to engage all of or a part of the second bent portion 3c of the first coil piece 3 with the second joint portion 3e of another first coil piece 3. The one-side second joint recess 22e has a through-hole 22g which passes all the way therethrough, and which is communicated with the through-hole 3g of the second joint portion 3e of the first coil piece 3.

Note that the one-side second joint recess has the same structure as that of the one-side first joint recess 22d except that a shape at the inner periphery area 22C is formed so as to correspond to the power-feeding-terminal connecting portion 4e of the second coil piece 4.

The first coil piece 3 and the second coil piece 4 used in the base member 22 shown in FIG. 10 should employ a structure that an insulating material is coated on the surface thereof or the insulating material is provided thereon in order to ensure the insulation property relative to an adjoining first coil piece 3 or second coil piece 4.

<Another Modified Embodiment of Base Member>

Figure 11:
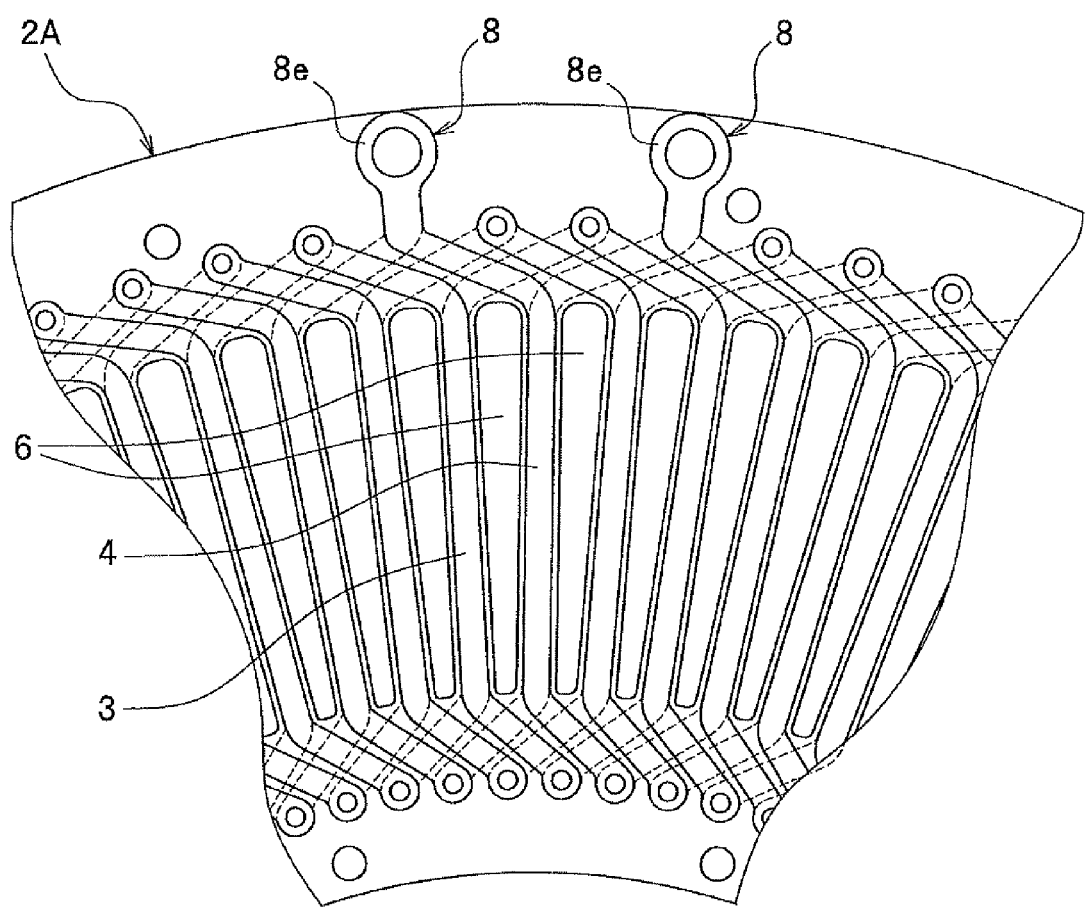
FIG. 11 is a plane view schematically showing another structure of a base member in the stator coil for an axial gap electrical rotating machine with a part of the base member being omitted.
Figure 12:
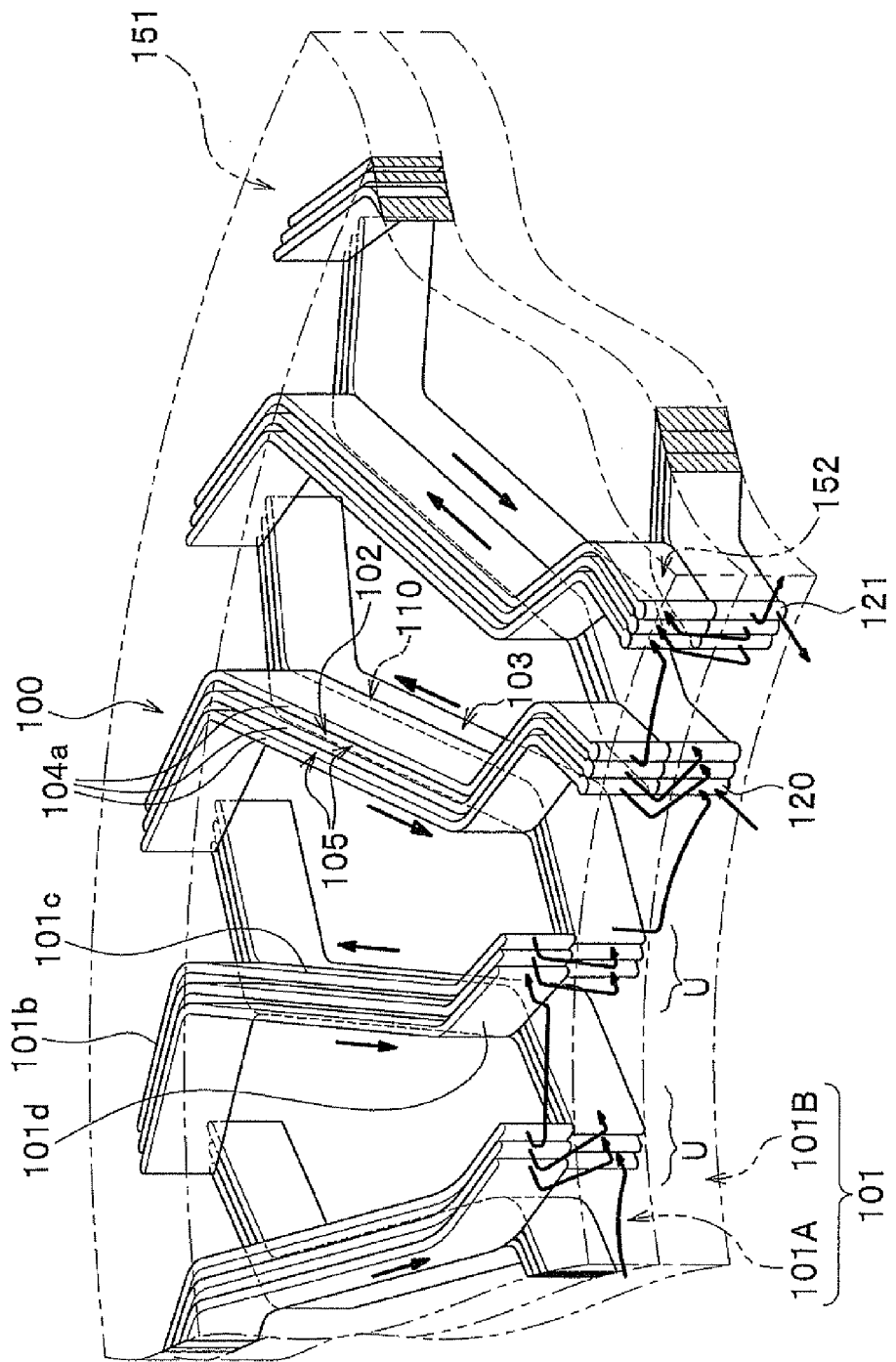
FIG. 12 is a perspective view schematically showing a connection structure of a coil part of a conventional stator coil for an axial gap electrical rotating machine.

Further, as shown in FIG. 11, the arrangement of the second coil piece 4 in the base member can also be modified. FIG. 11 is a plane view schematically showing another structure of a base member in the stator coil for an axial gap electrical rotating machine with a part of the base member being omitted. In a base member 2A, the power-feeding-terminal connecting portion 4e is arranged at the outer periphery side, not at the inner periphery side. According to the base member 2A, the second joint recess 7e at the inner periphery side of the base member 2 already explained is located at the outer periphery side, the first joint recess 7d, and the joint recess 8 are located at the inner periphery side.

According to the embodiments of the present invention, the recesses 7 and 8 are arranged to hold the first and second bars 3a and 4a to be extended in radial directions RD at a regular interval. The recesses 7 and 8 are arranged to hold the power-feeding-terminal connecting portion 4e outside the first, second, and third joint portions 3d, 3d, 4d, and 4e in the radial directions RD more inward and outward than the first, second, and third joint portions 3d, 3d, 4d, and 4e in the radial directions RD).

Further, the recesses 7 and 8 are arranged to hold the first and second middle bar portions 3a and 4a on the two sides of the base member, and a pair of the recesses 7 and 8 on the two faces are at corresponding opposite positions to arrange any combination of the first and second middle bar portions (first middle bar portions 3a, first and second middle bar portions 4a, or second middle bar portions 4a) in the pair of the recesses 7 and 8 in parallel and adjacently to enhance the magnetic fluxes.

It is not illustrated in the figure, but the first joint portion 3d and the second joint portion 3e of the first coil piece 3 (13, 23, 33) and the third joint portion 4d of the second coil piece 4 facing and abutting one another may be joined together by ultrasonic joining using an ultrasonic joining apparatus (not shown). As the joined portions are joined by ultrasonic joining, the joining work can be carried out rapidly, and a joining area can be just small.

According to the above-explained stator coil 1, the number of turns can be increased by stacking coil units, each having the first coil piece 3 and the second coil piece 4 disposed on the base member 2 in the direction in which the coil units are stacked, so that the manufacturing process can be facilitated, and an aluminum alloy (or aluminum) which cannot used in a structure in which the number of turns is increased in the circumferential direction CIR becomes available.

INDUSTRIAL APPLICABILITY

The present invention can be applied to a stator coil for an electrical rotating machine, and more specifically, a stator coil for an axial gap electrical rotating machine.

The invention claimed is:
1. A stator coil for an axial gap electrical rotating machine, the stator coil comprising:
   a plurality of first coil pieces each comprising a conductive material;
   a plurality of second coil pieces each comprising a conductive material; and
   an annular base member having recesses on two sides thereof and through holes, wherein the recesses are arranged in a circumferential direction of the annular base member and hold the first coil pieces and the second coil pieces; wherein
   the first coil piece comprises:
   a first middle bar portion;
   a first bent portion and a second bent portion continuous from one end of the first middle bar portion and an other end thereof, respectively, and bent at predetermined angles in the circumferential direction;
   a first joint portion formed at a leading end of the first bent portion; and
   a second joint portion at a leading end of the second bent portion, wherein
   the second coil piece comprises:
   a second middle bar portion;
   a third bent portion and a fourth bent portion continuous from one end of the second middle bar portion and an other end thereof, respectively, and bent at predetermined angles in the circumferential direction;

a power feeding terminal connection portion formed at one leading end of either one of the third bent portion or the fourth bent portion; and a third joint portion at an other leading end of the third bent portion and the fourth bent portion; and wherein the first joint portions of one and another of the first coil pieces face and are connected to each other across the base member through the through holes, wherein the second joint of one of the first coil piece or the third joint portion of one of the second coil pieces faces the second joint portion of another of the first coil pieces and are connected to each other, across the base member through the through holes to provide a coil loop.

2. The stator coil according to claim 1, further comprising a bus bar, wherein the stator coil comprising two of the second coil pieces adjoining each other on one of the two sides of the base member, and the bus bar electrically connect the power feeding terminal connection portions of the second coil pieces adjoining each other, and wherein the stator coil comprising further two of the second coil pieces adjoining each other on the other of the two sides of the base member to be supplied with power.

3. The stator coil according to claim 1, further comprising:
a first interlayer connection portion configured to connect the first joint portions facing each other; and
a second interlayer connection portion configured to connect the second joint portion or the third joint portion and the second joint portion facing each other through the through holes.

4. The stator coil according to claim 3, wherein the first and second interlayer connection portions each comprise a joint pin.

5. The stator coil according to claim 3, wherein the interlayer connection portion comprises an ultrasonic joining layer.

6. The stator coil according to claim 1, wherein the recesses are arranged so as to hold the first and second middle bar portions, at a regular interval in the circumferential direction, to be extended in radial directions and the power-feeding-terminal connection portion more outward or inward than the first and second joint portions in the radial direction.

7. The stator coil according to claim 1, wherein the base member further comprising a through hole for supporting a magnetic flux converting member comprising a ferromagnetic material.

8. The stator coil according to claim 1, wherein the first and second coil pieces have a width greater than a thickness thereof.

9. The stator coil according to claim 1, wherein the conductive material is selected from the group comprising copper, copper alloy, aluminum, and aluminum alloy.

10. The stator coil according to claim 1, wherein the recesses are arranged to hold the first and second middle bar portions on the two sides of the base member, and a pair of the recesses on the two faces are at corresponding opposite positions to arrange a combination of the first and second middle bar portions in the pair of the recesses in parallel and adjacently.

11. The stator coil according to claim 1, wherein the recesses on one of the two sides of the base member hold the first and second coil pieces so as to orient the first and second bent portions in the circumferential direction, and the recesses on the other of the two sides of the base member hold the first and second coil pieces so as to orient the first and second bent portions in an opposite direction of the circumferential direction.

12. The stator coil according to claim 1, wherein the base member comprises a plurality of the base members stacked on an axial direction thereof, each comprising the first and second coil pieces.

13. The stator coil according to claim 12, wherein the power feeding terminal connecting portions comprise first to third types of connectors, the first type of the connectors are connected to each other on one of the two sides of the base member, the second type of the connector are connected to each other on two adjoining base members, and the third type of the power feeding terminals connecting portions are supplied with power.

* * * * *